United States Patent
Jang

(10) Patent No.: US 11,068,050 B2
(45) Date of Patent: Jul. 20, 2021

(54) METHOD FOR CONTROLLING DISPLAY OF VIRTUAL IMAGE BASED ON EYE AREA SIZE, STORAGE MEDIUM AND ELECTRONIC DEVICE THEREFOR

(71) Applicant: SAMSUNG ELECTRONICS CO., LTD., Suwon-si (KR)

(72) Inventor: Won-Nam Jang, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 109 days.

(21) Appl. No.: 15/901,052

(22) Filed: Feb. 21, 2018

(65) Prior Publication Data

US 2018/0239425 A1  Aug. 23, 2018

(30) Foreign Application Priority Data

Feb. 21, 2017 (KR) .................. 10-2017-0023172

(51) Int. Cl.
*G06F 3/01* (2006.01)
*G06T 19/00* (2011.01)
(Continued)

(52) U.S. Cl.
CPC ......... *G06F 3/013* (2013.01); *G02B 27/0093* (2013.01); *G02B 27/017* (2013.01); *G02B 27/0176* (2013.01); *G06F 3/011* (2013.01); *G06F 3/012* (2013.01); *G06F 3/015* (2013.01); *G06F 3/017* (2013.01); *G06F 3/0346* (2013.01); *G06T 19/006* (2013.01); *G02B 2027/0138* (2013.01); *G02B 2027/0178* (2013.01)

(58) Field of Classification Search
None
See application file for complete search history.

(56) References Cited

U.S. PATENT DOCUMENTS 7,744,216 B1 * 6/2010 Uhlhorn .................. G09G 5/00
351/204
2012/0242570 A1 * 9/2012 Kobayashi ......... G02B 27/0093
345/156

(Continued)

FOREIGN PATENT DOCUMENTS

JP  2016-45815 A  4/2016
KR  10-2013-0118761 A  10/2013

OTHER PUBLICATIONS

International Search Report (PCT/ISA/210), issued by International Searching Authority in corresponding International Application No. PCT/KR2018/002107, dated May 18, 2018.
(Continued)

*Primary Examiner* — Amr A Awad
*Assistant Examiner* — Donna V Bocar
(74) *Attorney, Agent, or Firm* — Sughrue Mion, PLLC

(57) ABSTRACT

An electronic device comprises a first camera module, a display device, and a processor functionally connected with the first camera module and the display device. The processor may be configured to determine a size of at least one eye area included in an image obtained by the first camera module while displaying a virtual image using the display device and to control a degree of display of the virtual image corresponding to the size of the at least one eye area. Other various embodiments are also available.

25 Claims, 25 Drawing Sheets

(51) Int. Cl.
*G02B 27/01* (2006.01)
*G02B 27/00* (2006.01)
*G06F 3/0346* (2013.01)

(56) References Cited

U.S. PATENT DOCUMENTS

| | | | |
|---|---|---|---|
| 2014/0152781 | A1 | 6/2014 | Nam et al. |
| 2016/0004307 | A1* | 1/2016 | Kasahara ............... G02B 27/00 348/78 |
| 2016/0026253 | A1* | 1/2016 | Bradski ................ G02B 27/225 345/8 |
| 2016/0034032 | A1* | 2/2016 | Jeong ...................... G06F 3/013 345/156 |
| 2016/0239082 | A1* | 8/2016 | Takano ................... G06F 3/005 |
| 2016/0267716 | A1 | 9/2016 | Patel |
| 2016/0270648 | A1* | 9/2016 | Freeman ............. A61B 3/0025 |
| 2016/0320620 | A1* | 11/2016 | Maimone ............... G06F 3/011 |
| 2017/0011557 | A1 | 1/2017 | Lee et al. |
| 2017/0024893 | A1 | 1/2017 | Kruglick |
| 2017/0205874 | A1* | 7/2017 | Miyaguchi ........... G06F 3/0484 |
| 2018/0052326 | A1* | 2/2018 | Wall .................... H04N 13/344 |
| 2018/0088666 | A1* | 3/2018 | Ayoub .................. G06F 3/013 |
| 2018/0174366 | A1* | 6/2018 | Nishibe .............. G06F 3/04842 |

OTHER PUBLICATIONS

Written Opinion (PCT/ISA/237) issued by the International Searching Authority in corresponding International Application No. PCT/KR2018/002107, dated May 18, 2018.

\* cited by examiner

METHOD FOR CONTROLLING DISPLAY OF VIRTUAL IMAGE BASED ON EYE AREA SIZE, STORAGE MEDIUM AND ELECTRONIC DEVICE THEREFOR

CROSS-REFERENCE TO RELATED APPLICATION(S)

This application claims priority under 35 U.S.C. § 119(a) from a Korean patent application filed in the Korean Intellectual Property Office on Feb. 21, 2017 and assigned Serial No. 10-2017-0023172, the disclosure of which is incorporated herein by reference in its entirety.

TECHNICAL FIELD

Various embodiments relate to methods for displaying virtual images, storage media, and electronic devices for the same.

DISCUSSION OF RELATED ART

Augmented reality (AR) is related to virtual reality and is a computer graphic scheme that enables a virtual object to appear to be present in an original environment by synthesizing the virtual object or information with the actual environment. Augmented reality (AR) is a technique by which a user is shown an overlap of the virtual object on the real-life world the user sees with his eyes. It shows a single image obtained by mixing additional information and virtual world with the real world in real-time, and thus, it is also referred to as mixed reality (MR).

Virtual reality (VR) refers to an environment or circumstance that is similar to a real-life environment as created by computer graphics and typically entails providing an interface that enables a human being to feel the environment through his sense organ as if he interacts with it. VR techniques enable the user to be immersed in VR environment, so that the user cannot view the actual environment.

However, AR reality, i.e., a combination of actual and VR objects, may enable the user to view the actual environment in a manner that differs from existing VR reality, providing enhanced life-like feelings and additional information.

As smartphones are recently in wide use, AR technology includes various applications in various reality environments, and its uses are expanding, such as location-based services, mobile games, or education sectors. By wearing a head-mounted display (HMD), a user may view the screen that varies in correspondence to his motion, thereby enabling the user to experience more life-like services.

Where a confusion arises between a virtual object and a real object, it may not be easy for the user to identify only the virtual object image which is overlaid on the real image. This leads to a need for a method for distinguishing the virtual image from the real image. To identify the virtual image, the user may turn off the AR functionality of the electronic device or takes off the HMD device. However, this may be quite burdensome to the user.

Recent AR technology is being developed to enable a creation of virtual objects that are more similar to their real counterpart objects. Accordingly, AR may overlay a three-dimensional (3D) virtual image on an actual image that the user is viewing as including the real objects, thereby causing an ambiguity in distinguishing the real environment from the virtual screen.

The above information is presented as background information only to assist with an understanding of the present disclosure. No determination has been made, and no assertion is made, as to whether any of the above might be applicable as prior art with regard to the present disclosure.

SUMMARY

According to various embodiments, there may be provided a virtual image displaying method that enables a user to easily identify virtual images, a storage medium, and an electronic device for the same.

According to an embodiment of the present disclosure, an electronic device comprises a first camera module, a display device, and a processor that is functionally connected with each of the first camera module and the display device, wherein the processor may be configured to determine a size of at least one eye area included in an image obtained by the first camera module while displaying a virtual image using the display device and to control a degree of display of the virtual image based on the determined size of the at least one eye area.

According to an embodiment of the present disclosure, a method for displaying a virtual image in an electronic device may comprise obtaining an image using a first camera module while displaying the virtual image, determining a size of at least one eye area included in the obtained image, and controlling a degree of display of the virtual image based on the determined size of the at least one eye area.

According to an embodiment of the present disclosure, there may be provided a non-transitory storage medium storing instructions, the instructions configured to be executed by at least one processor to enable the at least one processor to perform at least one operation comprising obtaining an image using a first camera module while displaying the virtual image, determining a size of at least one eye area included in the obtained image, and controlling a degree of display of the virtual image based on the determined size of the at least one eye area.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

Throughout the drawings, like reference numerals will be understood to refer to like parts, components, and structures.

DETAILED DESCRIPTION

Figure 1:
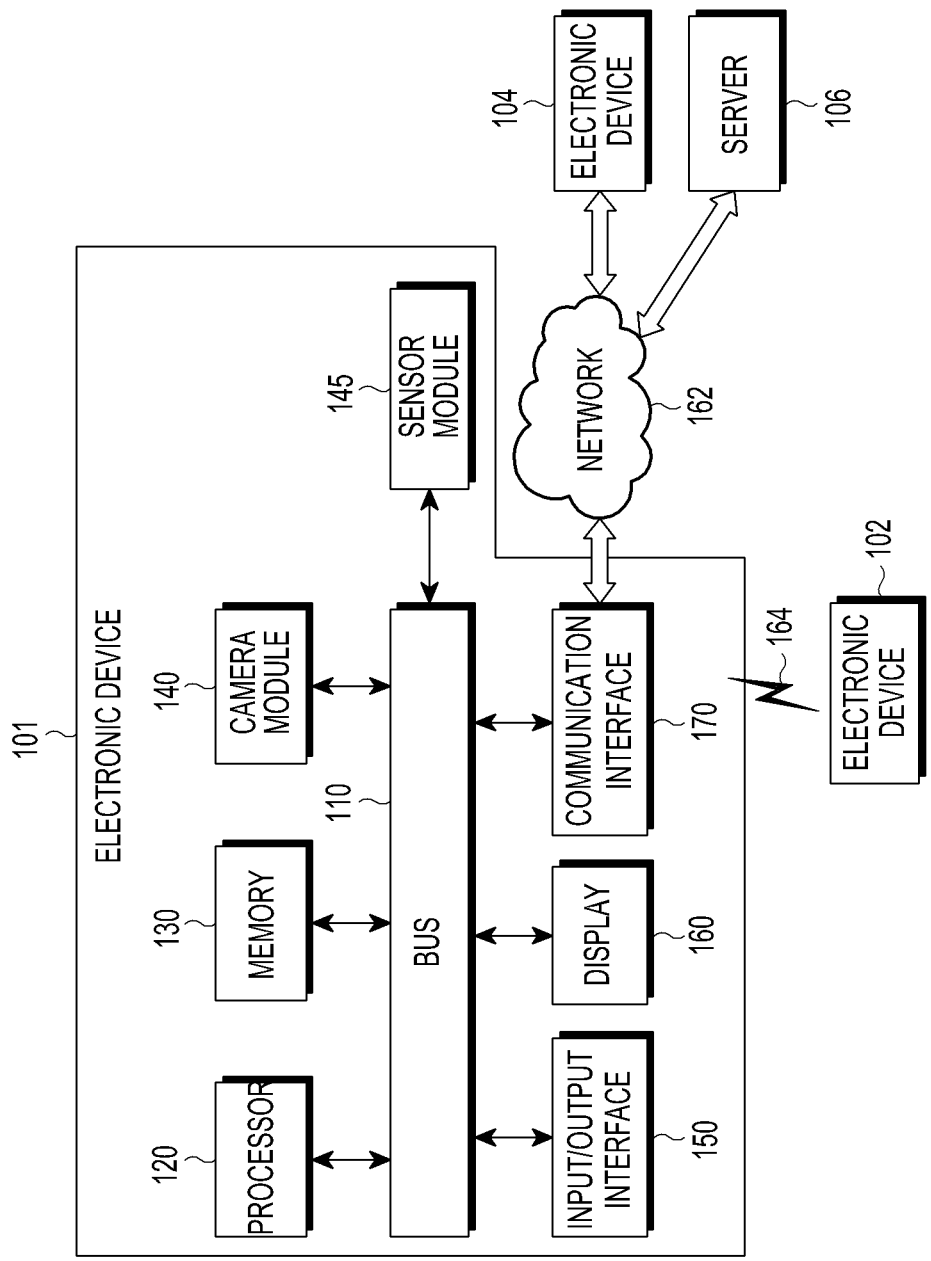
FIG. 1 illustrates a network environment including an electronic device, according to an embodiment.

Hereinafter, embodiments of the present disclosure are described with reference to the accompanying drawings. However, it should be appreciated that the present disclosure is not limited to the embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element. As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the electronic device according to embodiments of the present disclosure may include at least one of a smartphone, a tablet personal computer (PC), a mobile phone, a video phone, an electronic book (e-book) reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric-integrated or clothes-integrated device (e.g., electronic clothes), a body attaching-type device (e.g., a skin pad or tattoo), or a body implantable device. In some embodiments, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller machines (ATMs), point of sales (POS) devices, or "Internet of things" (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the electronic device may at least one of a portion of a piece of furniture, building/structure or vehicle, an electronic board, an electronic signature receiving device, a projector, or various measurement devices (e.g., devices for measuring water, electricity, gas, or electromagnetic waves). According to embodiments of the present disclosure, the electronic device may be flexible or may be a combination of the above-enumerated electronic devices. According to an embodiment of the present disclosure, the electronic device is not limited to the above-listed embodiments. As used herein, the term "user" may denote a human or another device (e.g., an artificial intelligent electronic device) that uses the electronic device.

Referring to FIG. 1, according to an embodiment of the present disclosure, an electronic device 101 is included in a network environment 162. The electronic device 101 may include a bus 110, a processor 120, a memory 130, a camera module 140, a sensor module 145, an input/output interface 150, a display 160, and a communication interface 170. In some embodiments, the electronic device 101 may exclude at least one of the components or may add another component.

The bus 110 may include a circuit for connecting the components 110 to 170 with one another and transferring communications (e.g., control messages or data) between the components.

The processor 120 may control the overall operation of the electronic device 101.

The processor 120 may include one or more of a central processing unit (CPU), an application processor (AP), and a communication processor (CP). The processor 120 may perform control on at least one of the other components of the electronic device 101 or perform an operation or data processing relating to communication. The processor 210 may load a command or data received from at least one of other components (e.g., a non-volatile memory) on a volatile memory, process the command or data, and store resultant data in the non-volatile memory.

The memory 130 may include a volatile or non-volatile memory. For example, the memory 130 may store commands or data related to at least one other component of the electronic device 101. According to an embodiment of the present disclosure, the memory 130 may store software or a program. The program may include, e.g., any of a kernel, middleware, an application programming interface (API), and/or an application program (or an application). At least a portion of the kernel, middleware, or API may be denoted an operating system (OS). For example, the kernel may control or manage system resources (e.g., the bus 110, the processor 120, or a memory 130) used to perform operations or functions implemented in other programs (e.g., the middleware, API, or application program). Further, the kernel may provide an interface that enables access via the middleware, API or application program to individual components of the electronic device 101 to control or manage the system resources.

For example, the memory 130 may include at least one of a volatile memory (e.g., a dynamic random access memory (RAM) (DRAM), a static RAM (SRAM), a synchronous dynamic RAM (SDRAM), etc.) or a non-volatile memory (e.g., a one-time programmable read-only memory (ROM) (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD)).

According to an embodiment of the present disclosure, the memory 130 may store software and/or a program for providing an AR service. Using the data stored in the memory 130, the processor 120 may display, to the user, image data configured by associating a virtual image with each external object recognized within an image obtained by capturing the external object.

The camera module 140 may be a device that is configured for capturing still images and videos, and may include, according to an embodiment of the present disclosure, one or more image sensors (e.g., a front sensor and/or a back sensor), a lens, an image signal processor (ISP), and/or a flash, such as a light-emitting diode (LED) or xenon lamp.

According to an embodiment of the present disclosure, the camera module 140 may capture an image that includes the user's eye under the control of the processor 120. To grasp eye image data in order to obtain an iris image, the camera module 140 may include an infrared (IR) emitter. The camera module 140 may include a light to radiate an eye area.

According to an embodiment of the present disclosure, the camera module 140 may include a first camera module that is configured for capturing the user's eye and a second camera module that is configured for capturing a front view of the user. For example, the first camera module may be positioned on a first surface (e.g., the front surface) of the housing of the electronic device 101, and the second module may be positioned on a second surface (e.g., the rear surface) which is positioned opposite the first surface.

Since the first camera module is positioned on the front surface of the electronic device 101, the first camera module may obtain a captured image of the user's eye or face. The processor 120 may detect the eye area and generate information about the detected eye area based on the image obtained by the first camera module. The information about the eye area may include the size of at least a portion of one of the user's eyes, e.g., the size of the pupil, and the degree of the eye lid closing. The size of the pupil may be calculated as the horizontal or vertical length or area, and the degree of the eye lid closing may also be calculated as a length or area.

Since the second camera module is positioned opposite to the first camera module, i.e., the rear surface of the electronic device 101, the second camera module may obtain a captured image of the front view, i.e., a view of that which is observable by the user's eyes. The processor 120 may recognize at least one external object within the captured image of the front view upon executing the AR service, and the processor 120 may then associate a virtual image with at least one external object as a result of the recognition. The processor 120 may perform control to display at least one respective virtual image associated with each of at least one respective external object.

According to an embodiment of the present disclosure, the camera module 140 may be an image capturing device that communicates with the electronic device 101 outside the electronic device 101. For example, the image capturing device may capture an image (or video) omni-directionally at 360 degrees with respect to a fixed gaze point. In this aspect, the omni-directional image is an image that includes all of the views that the capturer can see when he or she spins in place and looks up or down. The image capturing device may include at least one lens or camera that is configured for capturing omni-directional images.

For example, a fisheye lens may have a view angle of 180 degrees or more. In particular, when the fisheye lens is positioned towards the sky, it is possible to capture a single piece of image of an area from a constellation to the horizon.

The image capturing device may have a plurality of fisheye lenses which are configured to capture an image omni-directionally. As another example, the image capturing device may have a plurality of cameras, each of which has a predetermined view angle, for capturing an image omni-directionally. In this case, the plurality of cameras may be provided in the image capturing device to cover all directions with respect to one particular point. As another example, the image capturing device having one or more cameras may automatically or manually be moved (e.g., in the direction of pitch, yaw, or roll) to capture images in all directions. As another example, the image capturing device may include a plurality of cameras, each of which has a respective predetermined view angle that corresponds to the user's left and right eyes. In this case, the image capturing device may capture a stereoscopic image that includes multiple omni-directional images by capturing images in all directions. In this aspect, examples of the image capturing device are not limited to those described above.

The image capturing device may capture not only omni-directional images, but also images of some particular directions (e.g., a rectangular area spanning at 120 degrees from top to bottom and from left to right with respect to the lens of the image capturing device). The image capturing device may capture an omni-directional image and transmit the images for some directions of the omni-directional image to the processor 120 via the communication interface 170.

For example, the sensor module 145 may measure a physical quantity or detect a motion state of the electronic device 101, and the sensor module 145 may convert the measured or detected information into an electrical signal and transmit the sensed information to the processor 120.

The sensor module 145 may include at least one of, e.g., any of a gesture sensor, a gyro sensor, an atmospheric pressure sensor, a magnetic sensor, an acceleration sensor, a grip sensor, a proximity sensor, a color sensor, such as a red-green-blue (RGB) sensor, a bio sensor, a temperature/humidity sensor, an illumination sensor, or an Ultra Violet (UV) sensor.

Additionally or alternatively, the sensing module 145 may include, e.g., any of an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 145 may further include a control circuit for controlling at least one or more of the sensors included in the sensing module. According to an embodiment of the present disclosure, the electronic device 101 may further include a processor configured to control the sensor module 145 as part of the processor 120 or separately from the processor 120, and the electronic device 2701 may control the sensor module 145 while the processor 1210 is in a sleep mode.

According to an embodiment of the present disclosure, relevant metadata may be recorded in association with an image captured upon capturing an actual view. Sensing information obtained through the sensor module 145 upon capturing may be included in the metadata while matching (or being associated with) the captured image. In this aspect, the sensing information associated with the captured image may include at least one of the position of the electronic device 101, the direction (e.g., the direction captured) of the electronic device 101 and motion (or movement) information about the electronic device 101.

For example, the input/output interface 150 may transfer commands or data input from the user or other external device to other component(s) of the electronic device 101, or may output commands or data received from other component(s) of the electronic device 101 to the user or other external devices.

The display 160 may include, e.g., any of a liquid crystal display (LCD), a light emitting diode (LED) display, an organic light emitting diode (OLED) display, a microelectromechanical systems (MEMS) display, and/or an electronic paper display. The display 160 may display, e.g., various contents (e.g., text, images, videos, icons, or symbols) to the user. The display 160 may include a touchscreen and may receive, e.g., a touch, gesture, proximity or hovering input via the use of an electronic pen or a body portion of the user.

For example, the communication interface 170 may set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device (e.g., the image capturing device, the second external electronic device 104 or server 106).

The wireless communication may include cellular communication which uses a protocol that includes at least one of, e.g., long term evolution (LTE), long term evolution-advanced (LTE-A), LTE in unlicensed spectrum (LTE-U), code division multiple access (CDMA), wideband code division multiple access (WCDMA), universal mobile telecommunication system (UMTS), wireless broadband (WiBro), or global system for mobile communication (GSM). According to an embodiment of the present disclosure, the wireless communication may include at least one of, e.g., wireless-fidelity (Wi-Fi), light-fidelity (Li-Fi), Bluetooth, Bluetooth low power (BLE), Zigbee, near-field communication (NFC), magnetic secure transmission (MST), radio frequency (RF), or body area network (BAN) as denoted as element 164 of FIG. 1. According to an embodiment of the present disclosure, the wireless communication may include a global navigation satellite system (GNSS) and/or a Global Positioning System (GPS). Hereinafter, the terms "GPS" and "GNSS" may be interchangeably used. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same type or a different type from the electronic device 101. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, for example, a cloud computing technology, a distributed computing technology, or a client-server computing technology may be used.

According to an embodiment of the present disclosure, an electronic device (e.g., the electronic device 101) may comprise a first camera module, a display device (e.g., the display 160), and a processor (e.g., the processor 120) that is functionally connected with each of the first camera module and the display device. The processor may be configured to determine a size of at least one eye area included in an image obtained by the first camera module while displaying a virtual image by using the display device and to control a degree of display of the virtual image based on the determined size of the at least one eye area.

According to an embodiment of the present disclosure, the processor may be configured to vary a degree of display of at least one from among a transparency, a highlight, an inversion, a color change, and a contour of the virtual image based on the determined size of the at least one eye area, and to display the virtual image that has the varied degree of display. For example, the processor may adjust the transparency or a highlight of the virtual image to be distinguished from the actual view (or its optical image) upon which the user is gazing, based on the size of the at least one eye area, and then display the adjusted virtual image. As another example, the processor may invert the virtual image based on the size of the at least one eye area and stepwise adjust the color upon inversion. As yet another example, the processor may change the color, or the background color, of the virtual image into a different color, based on the size of the at least one eye area. As still another example, the processor may vary the thickness, type, and/or color of the contour of the virtual image based on the size of the at least one eye area.

According to an embodiment of the present disclosure, the processor may be configured to vary a degree of display of at least one of a size and a ratio of the virtual image based on the determined size of the at least one eye area and to display the virtual image that has the varied degree of display. For example, the processor may stepwise enlarge or shrink the virtual image based on the size of the at least eye area and display the virtual image after the size adjustment is complete.

According to an embodiment of the present disclosure, when the display device is a projection display device, the processor may be configured to display the virtual image of which the degree of display has been varied by using the projection display device so as to be distinguished from an external object.

According to an embodiment of the present disclosure, the electronic device (e.g., the electronic device 101) may include a first camera module positioned on a first surface of the electronic device and a second camera module positioned on a second surface of the electronic device which is positioned opposite the first surface. The processor may be configured to vary the degree of display of the virtual image associated with a first image obtained by the second camera module based on the size of the at least one eye area and display the virtual image on a portion of the first image by using the display device. According to an embodiment of the present disclosure, the processor may be configured to perform control to output the virtual image that differs in at least one of a transparency and a resolution so as to be distinguished from the first image, based on the size of the at least one eye area. For example, the virtual image of which the degree of display has been varied may be displayed as an overlay on a portion of the first image which is a captured image of the actual view. According to an embodiment of the present disclosure, where the image is one captured for an external object on the view, the virtual image associated with the external object may be overlaid in the position that corresponds to each external object and displayed accordingly.

According to an embodiment of the present disclosure, where the electronic device (e.g., the electronic device 101) is a head-mounted electronic device, the first image that is displayed using the display device (e.g., the display 160) may include an image for left eye and an image for right eye.

According to an embodiment of the present disclosure, the processor may be configured to obtain a second image captured for at least one external object by the second camera module, to recognize the at least one external object included in the second image, to associate each of the at least one external object with at least one virtual image based on a result of the recognition, and to perform control so as to display the at least one virtual image associated with each of the at least one external object. For example, the at least one virtual image may be an advertisement image that corresponds to the at least one external object.

According to an embodiment of the present disclosure, the processor may be configured to determine whether a state of an eye closing is maintained for a predetermined time by using the size of the at least one eye area and to release the display of the virtual image when the state of the eye closing is maintained for the predetermined time. According to an embodiment of the present disclosure, the processor may be configured to determine whether the state of the eye closing is maintained for a predetermined time by using the size of the at least one eye area after releasing the display of the virtual image and to display the virtual image using the display device when the state of the eye closing is maintained for the predetermined time.

For example, when at least one of the user's eyes becomes half closed while the user is viewing the virtual image-overlaid actual view image (or a captured image of the external object) with open eyes, the virtual image may be displayed with the degree of display of the virtual image varied so that the virtual image is distinguished from the view image. When the eye closing state lasts for at least a predetermined amount of time, the virtual image may temporarily be stopped from display. Thereafter, when desired, the user may cause the displaying of the virtual image to resume by maintaining the eye-open state, as he did previously, for a predetermined amount of time. Alternatively, the user may cause the displaying of the virtual image to resume, e.g., by opening his eye and keeping at least one eye closed for a predetermined amount of time as he did previously in order to release the display of the virtual image.

According to an embodiment of the present disclosure, the processor may be configured to determine whether the size of the at least one eye area is less than or equal to a mean eye area size and to vary the degree of display of the virtual image based on the size of the at least one eye area when a state in which the size of the at least one eye area is less than or equal to the mean eye area size is maintained for a predetermined amount of time and to display the virtual image that has the varied degree of display. According to an embodiment of the present disclosure, the processor may be configured to stepwise increase at least one of a transparency and a highlight of the virtual image based on the size of the at least one eye area and to display the virtual image for which the transparency and/or the highlight has been increased.

To prevent the degree of display of the virtual image from varying whenever a detection of the user's unintentional eye actions occurs, such as unconscious blinks that do not indicate the user's intention to control the display of the virtual image, the processor may detect the size of the at least one eye area based on a mean eye area size and whether the user's eye state continues being different from a previous state for a predetermined amount of time.

For example, where the state of the size being less than or equal to the mean eye area size continues for a predetermined amount of time, the processor may deem it as being an input to control the display of the virtual image. Accordingly, where the state of being less than or equal to the mean eye area size for a predetermined time lasts, the processor may cause the image whose portion has been hidden by the virtual image to resume being displayed by stepwise adjusting the degree of display, e.g., increasing the transparency of the virtual image, based on the detected size of the at least one eye area. For example, when such an eye size continues where at least one eye area of the user's eyes is partially hidden by the eyelid, the virtual image may be displayed with the degree of display of the virtual image being temporarily varied, and when the eye returns to its original size (e.g., the mean eye area size or less), the degree of display of the virtual image may revert back to the original, thereby causing the virtual image to be displayed as it had been displayed before the degree of display was varied.

Figure 2A:
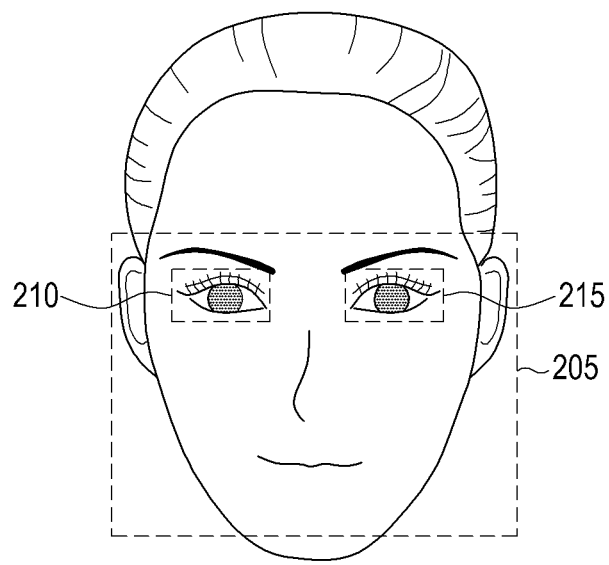
FIG. 2A is an example view illustrating a method for detecting an eye area from a face image, according to an embodiment.

FIG. 2A is an example view illustrating a method for detecting an eye area from a face image, according to an embodiment of the present disclosure.

As shown in FIG. 2A, the user's face may be captured via a camera (e.g., the camera module 140) of the electronic device 101. Where the electronic device 101 is a wearable device that resembles glasses, the camera of the electronic device 101 may be positioned so as to face the user's eyes, e.g., the user's right and left eyes. The camera positioned so as to face the user's eyes may output an image that includes captured eye areas of the user's eyes 210 and 215 to a processor (e.g., the processor 120). Where the electronic device 101 is a smartphone, a front camera of the electronic device 101 may output a captured face image of the user's face to the processor (e.g., the processor 120). At this time, the processor may detect only the face area 205 from the face image via a face area detection algorithm. The processor may detect the eye areas 210 and 215 from the detected face area 205 in a similar way as that employed for detecting the face area.

The processor may detect the image that includes the eye areas via the above-described detection method. The processor may determine the size of at least one eye area 210 or 215, e.g., the size of a pupil or a proportional amount of eye closure (i.e., 0% corresponding to an eye that is completely open and 100% corresponding to an eye that is completely closed).

Figure 2B:
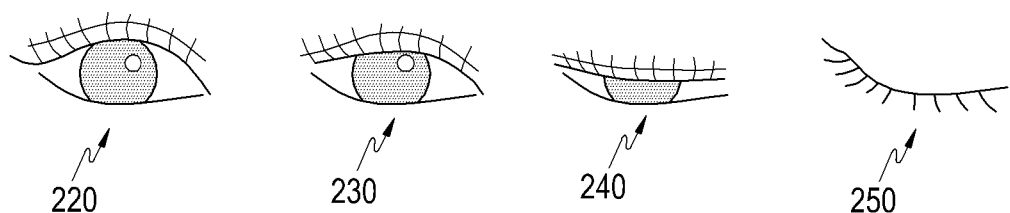
FIG. 2B is an example view illustrating the size of at least one eye area of a user, according to an embodiment.

FIG. 2B is an example view illustrating the size of at least one eye area of a user, according to an embodiment of the present disclosure.

As shown in FIG. 2B, there may be classified various eye states based on the size of at least one eye area. Although FIG. 2B illustrates one eye for ease of description purposes, it will be understood by persons having ordinary skill in the art that the other eye is also present. The size of the eye area may be classified into a plurality of steps 220, 230, 240, and 250, as shown in FIG. 2B, based on, e.g., the size of the pupil or the degree (i.e., proportional amount) of eyelid closing. According to an embodiment of the present disclosure, use of at least one eye area of both eyes enables detection of the size of the eye area in correspondence with various eye states, such as the state of both eyes being open, the state of only one eye being partially closed, the state of one eye being closed, or the state of both eyes being closed. For example, each of the plurality of eye states may correspond to each parameter of the size of at least one eye area. The eye state parameter that corresponds to the size of the at least one eye area may be used to determine the degree of display of a virtual image as compared with conditions for controlling the display of the virtual image. When the degree of display of the virtual image is determined, the display of the virtual image may be varied based on the degree of display determined to be distinguished from the actual view upon an AR service, and the resulting virtual image may be displayed.

Figure 2C:
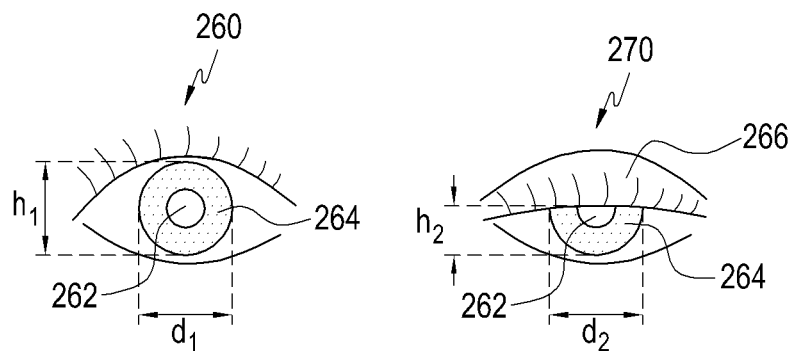
FIG. 2C is a view illustrating an example of a method for determining the size of at least one eye area of a user, according to an embodiment.

FIG. 2C is a view illustrating an example of a method for determining the size of at least one eye area of a user, according to an embodiment of the present disclosure.

For example, a first situation 260 in which the user fully opens either or both of his eyes and a second situation 270 in which the user partially closes either or both of his eyes are shown. Where the user opens his eye(s) (i.e., eye image 260), a pupil image of the pupil 262 and its ambient iris 264 which are in a relaxed state and have an eye area size of diameter d1 and height h1 may be obtained. Where the user partially closes his eye(s) (i.e., eye image 270), the pupil is partially hidden by the eyelid 266, so that a pupil image of the pupil 262 and its ambient iris 264 which have an eye area size of diameter d2 and height h2 may be obtained. Where the user fully closes his eye(s), the eye is hidden by the eyelid 266, thereby causing each of the diameter and height to become zero. Thus, the size of the eye area may also become zero. Where the user closes only one of his eyes, the size of the at least one eye area may become zero. Thus, the size of eye area which may be represented with a diameter and height may be varied based on the degree to which the pupil and/or the iris is hidden by the eyelid 266.

The processor (e.g., the processor 120) may monitor variations in the size of the at least one eye area based on variations in the diameter and height of the pupil. For example, the processor may monitor variations in the size of the eye area for a predetermined amount of time to calculate a mean eye area size. The calculated mean eye area size may be stored in a memory (e.g., the memory 130).

After calculating the mean eye area size, the processor may monitor, in real-time, variations in the size of the at least one eye area based on variations in the diameter and height of the pupil and compare the same with the mean eye area size. Where, upon executing an AR service, the mean eye area size is stored in the memory, the operation of calculating the mean eye area size may be omitted.

When the state of being the mean eye area size is maintained for a predetermined amount of time, the processor may determine that the user is in the state of partially closing his eye, and after determining how much variation of the degree of display of the virtual image corresponds to the size of the at least one eye area, the processor may vary the display of the virtual image based to the determined degree of display and display the resulting virtual image. For example, the size of the at least one eye area may be divided into a plurality of steps. The degree of display that corresponds to each step may previously have been stored in the form of a database.

After varying the degree of display of the virtual image, the processor may steadily monitor the size of the at least one eye area. When the user changes his eyelid position from being partially closed to being fully opened, the pupil which was partially hidden by the eyelid 264, e.g., the eye area, may increase in size from diameter d2 and height h2 to diameter d1 and height h1. Where the size of the at least one eye area returns to, e.g., the mean eye area size as a result of the monitoring for the predetermined time, the processor may revert the degree of display of the virtual image to the degree of display that had been used prior to the variation thereof, i.e., the initial set value.

Figure 3A:
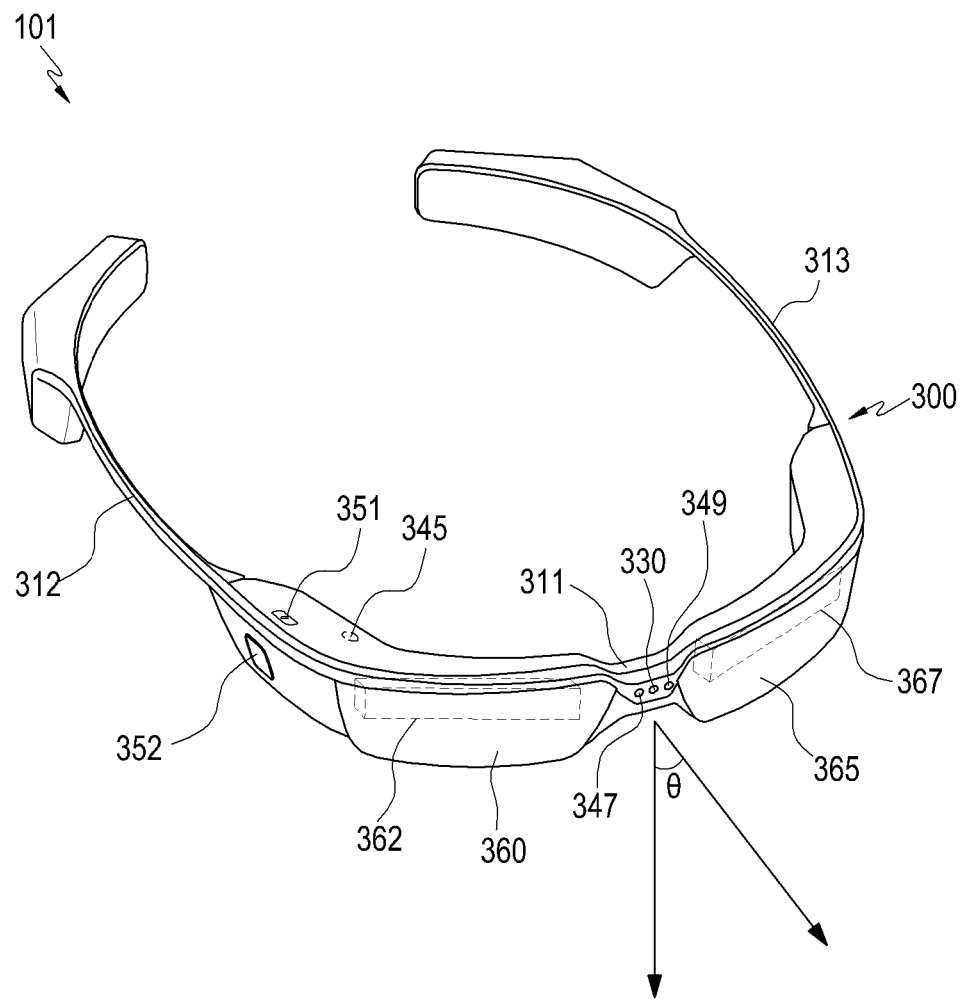
FIG. 3A is a perspective view illustrating a head-mounted electronic device, according to an embodiment.

FIG. 3A is a perspective view illustrating a head-mounted electronic device, according to an embodiment of the present disclosure. FIG. 3A illustrates a head-mounted electronic device as an example of the electronic device.

The head-mounted electronic device 101 as shown in FIG. 3A may resemble glasses, and may be referred to as any of, e.g., a portable terminal, a mobile terminal, a wearable device, a display device, or smart glasses.

The head-mounted electronic device 101 may include a housing 300, a first window 360, a second window 365, a first sensor 345, a third sensor 347, a power button 351, a touch sensor 352, a first light guide part 362, and a second light guide part 367.

The housing 300 may seat some components of the head-mounted electronic device 101 inside the housing 300. Other components of the head-mounted electronic device 101 may be installed in the housing 300 so as to be partially exposed to the outside.

The housing 300 may include a front frame 311 to which the first and second windows 360 and 365, which are facing the user's right and left eyes, are fastened, and a first temple frame 312 and a second temple frame 313, each of which extends from a respective end of the front frame 311. The right and left eyes may be referred to as first and second eyes. The first and second windows 360 and 365 may be called first and second glasses. The first and second windows 360 and 365 correspond to transparent protection glasses to block the influx of dust from the outside to the user's eyes. The first and second windows 360 and 365 may be omitted.

A first sensor 345, a camera module 330, and an illuminance sensor 349 may be positioned on the rear and front surfaces of the front frame 311. The power button 351 and the touch sensor 352 may be positioned on the top and side surfaces of the front frame 311.

The first sensor 345 may be placed on the rear surface of the front frame 311 to face the user's eyes. The first sensor 345 may emit light (e.g., an infrared (IR) or laser beam) to the user's eyes and detect light that reflects from the user's eyes. The first sensor 345 may output a captured image of the user's eye to the processor of the head-mounted electronic device 101. According to an embodiment of the present disclosure, the first sensor 345 may be a camera module that is configured to capture an image of the user's eyes.

According to an embodiment of the present disclosure, the first sensor 345 may include a lighting part (or a light source or light emitter) that emits light to the user's eyes and a light receiving part that detects light that reflects from the user's eye (or its retina). The first sensor 345 may output a signal/data (e.g., an image) that represents the reflected light to the processor 120. For example, the first sensor 345 may detect the reflected light as an image and output the image to the processor 120.

According to an embodiment of the present disclosure, the processor 120 may calculate the amount of light detected by the illuminance sensor 349 in order to determine the size of pupil and may use the same to calculate the size of an eye area.

According to an embodiment of the present disclosure, when a driving signal to drive the light receiving part (e.g., a camera) is input and light emitted to the pupil and reflected from the retina reaches the charge-coupled device (CCD) or complementary metal-oxide-semiconductor (CMOS) via the lens and aperture of the light receiving part, the light converts into an electrical signal. In this aspect, a captured image is created by using the electrical signal into which the CCD has converted the light. At this time, the captured retina image information (i.e., retina reflection surface size information or image signal processor (ISP) sensor pixel information) about the light reflected from the retina may include at least one of size information, area information, position information, pattern information, or brightness (or brightness distribution) information about the captured image. For example, each piece of information may include a corresponding value or a corresponding level (or an identifier/code that indicates same). According to an embodiment of the present disclosure, the light receiving part may be one of an IR camera or a visible light camera.

According to an embodiment of the present disclosure, at least part of the first sensor 345 may be positioned inside or outside the projection display device. Two first sensors 345 may be configured to correspond to the user's eyes.

The third sensor 347 may be positioned on the front surface of the front frame 311 to face forward, emit an IR or laser beam in front of the head-mounted electronic device 101, and detect the IR or laser beam that is reflected from an actual object. The third sensor 347 may output a detection signal that represents the distance between the third sensor 347 and the actual object to the processor of the head-mounted electronic device 101. The third sensor 347 may be provided to receive a detection signal for recognizing an external object within a captured front view image.

The camera module 330 may be positioned on the front surface of the front frame 311 to face forward and may output a captured image of the front view (i.e., surroundings or ambient environment in front within sector of angle θ) of the head-mounted electronic device 101 to the processor.

The first sensor 345 and the camera module 330 each may include a lens system and an image sensor. The first sensor 345 and the camera module 330 may convert light that is input (or captured) via their respective lens systems into image signals and output the image signals to the processor. The first sensor 345 and the camera module 330 each may capture a video or still image.

The lens system may cause light received from the outside to converge, thereby forming an image of the object. The lens system includes at least one lens, each of which may be a convex lens or an aspheric lens. The lens system may have symmetry with respect to the optical axis passing through the center of the lens system, and the optical axis may be defined as such central axis. The image sensor may detect an optical image formed by external light that is input via the lens system as an electrical signal. The image sensor may have a plurality of pixel units arranged in an M×N matrix structure, and the pixel units may include photodiodes and a plurality of transistors. The pixel unit may accumulate electric charges generated by input light, and the voltage that results from the accumulated electric charges may represent the illuminance of the input light. In processing one image constituting a still image or video, an image signal output from the image sensor may be constituted of a set of voltages (i.e., pixel values) output from the pixel units, and the image signal may represent one frame (i.e., a still image). The frame may be constituted of M×N pixels. As the image sensor, a CCD image sensor or CMOS image sensor may be used.

The image sensor may operate all of the pixels of the image sensor, or a subset of pixels that correspond to an interested area, according to a control signal received from the processor, and image data output from the pixels may be output to the processor.

The power button 351 may be positioned on the top surface of the front frame 311, and the head-mounted electronic device 101 may be powered on/off via a user input through the power button 351.

The touch sensor 352 may be positioned on a side surface of the front frame 311, detect at least one touch/hovering input, and transmit input information to the processor.

The first light guide part 362 may be included in a first projection display unit, disposed between the user's right eye and the first window 360, and project light that forms an image to the right eye.

The second light guide part 367 may be included in a second projection display unit, disposed between the user's left eye and the second window 365, and project light that forms an image to the left eye. The first and second projection display units may have the same configuration, and the projection display unit may be collectively referred to as a projector.

According to an embodiment of the present disclosure, the head-mounted electronic device 101 may include only one of the first and second projection display units. The first sensor 345 may be included in one of the first and second projection display units or provided separately from the first and second projection display units.

According to an embodiment of the present disclosure, at least one of the first and second projection display units and/or the first sensor 345 may be provided in the form of a detachable module that may be fastened or mounted and separated from the head-mounted electronic device 101.

According to an embodiment of the present disclosure, the head-mounted electronic device 101 may be provided in the form of a detachable module that may be fastened or mounted and separated from, e.g., glasses.

Figure 3B:
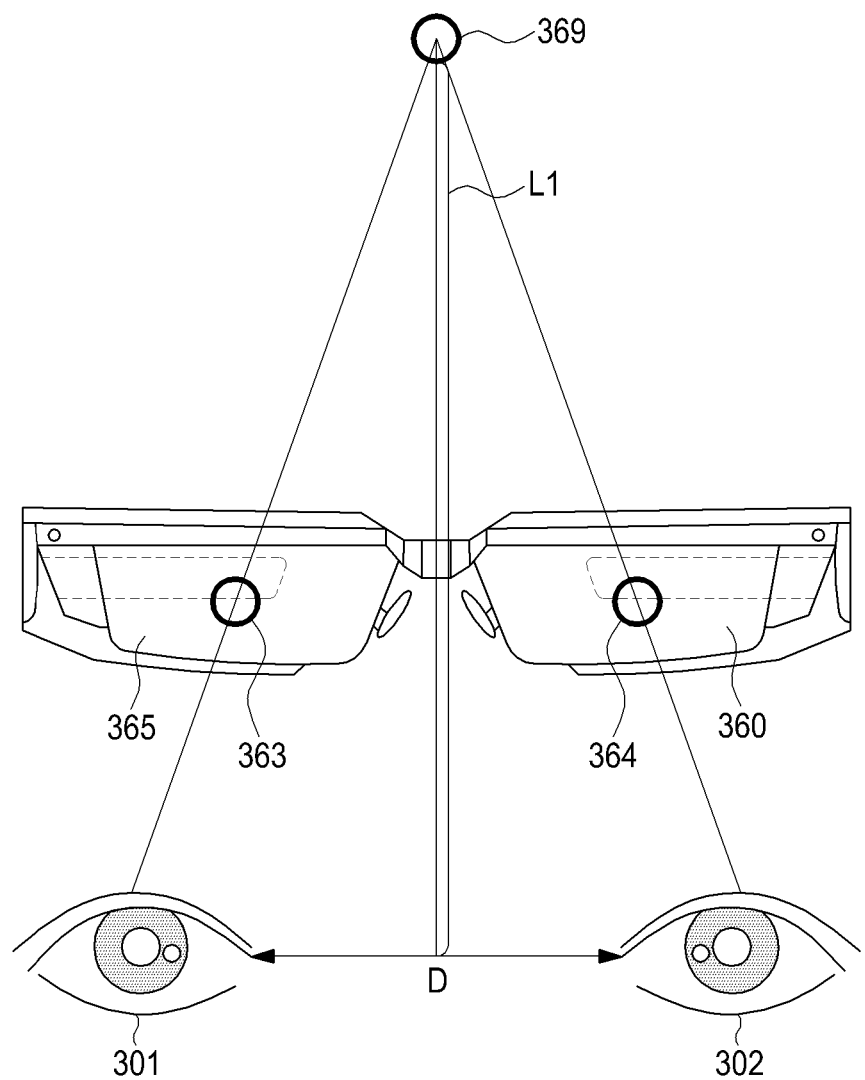
FIG. 3B is a view illustrating an electronic device, according to an embodiment.

FIG. 3B is a view illustrating a display by an electronic device, according to an embodiment of the present disclosure.

As shown in FIG. 3B, a first projection display unit may output first projection light via a first light guide part 362 to form a first virtual image that includes a first object 363. The first projection light may be focused and reflected by a first window 360, and the first projection light focused and reflected may form a first virtual image on the retina of the user's right eye 302. At this time, focusing means collecting light, including, e.g., letting light converge on one point or reducing the beam spot of light. For example, the reflected first projection light may converge on the crystalline lens or pupil of the right eye 302.

A second projection display unit may output second projection light through a second light guide part 367 to form a second virtual image including a second object 364. The second projection light may be focused and reflected by a second window 365, and the second projection light focused and reflected may form a second virtual image on the retina of the user's left eye 301. Here, an example of using two projection display units (e.g., projectors) is described, but only one projector may be used as well. In the following description, the first virtual image and the second virtual image may be the same except that they each are displayed on a respective one of both eyes. However, embodiments of the present disclosure are not limited thereto. For example, only one of the first and second virtual images may be displayed.

Referring to FIG. 3B, the inter-pupillary distance (IPD), which is a distance between the left eye 301 and the right eye 302, may be equal to D. The first virtual image and the second virtual image may correspond to the user's eyes and may be images that enable the user to view images while feeling a depth. As such, the virtual image may be an image for an AR service or an image configured to overlap in a position adjacent to some objects to provide a stereoscopic feeling for an external object included in the whole view image for the AR service.

The electronic device 101 may display a first object 363 and a second object 364 with them spaced apart from each other at a predetermined distance. The user may determine that an object (image) 369 is present at a point where a straight line passing through the left eye 301 and the first object 363 crosses a straight line passing through the right eye 302 and the second object 364. For example, the user may observe the presence of the virtual image at a point 369 that is positioned at a distance of L1 away from the user.

Figure 4A:
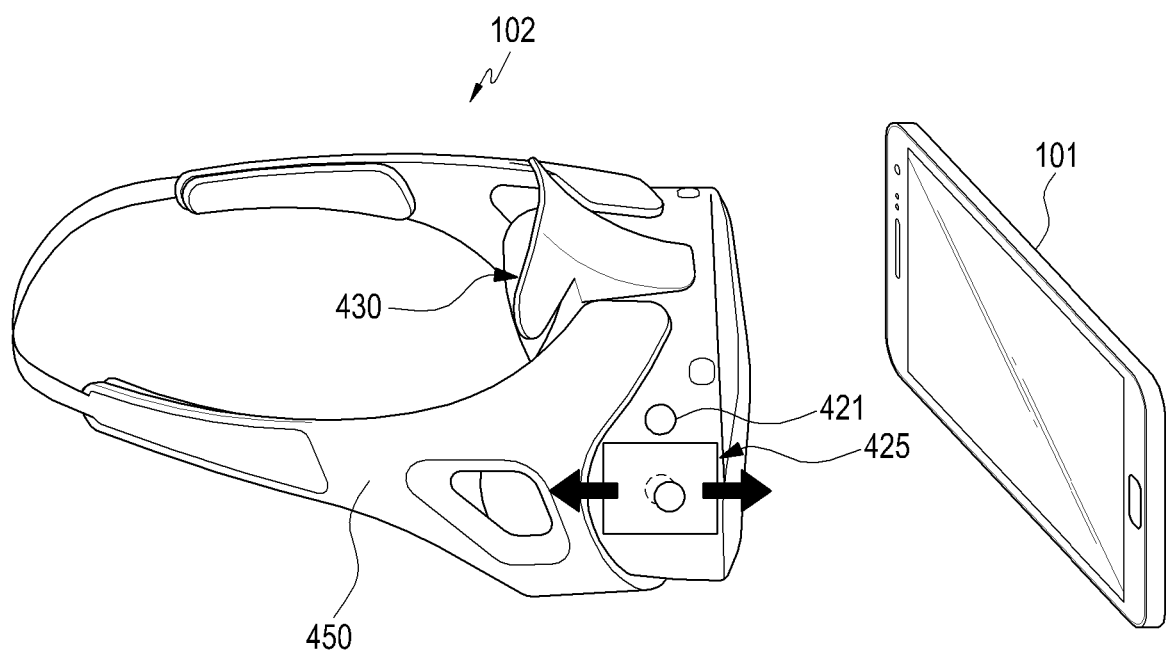
FIG. 4A is a view illustrating examples of electronic devices, according to an embodiment.

FIG. 4A is a view illustrating an electronic device 101 and an electronic device 102, according to an embodiment of the present disclosure.

The electronic device 101 may store a 3D application (or an AR application or VR application) and a 3D graphic library. The 3D application may be an application that is capable of providing a user with the same or similar screen to the reality. According to an embodiment of the present disclosure, AR may correspond to a space that may be seen in an immediate vicinity of the user (or original point or camera) or may include a synthesized one of virtual images that is viewable as a real object present on the actual view in the direction that the user is viewing. According to an embodiment of the present disclosure, AR may be one obtained by rendering a 360-degree, omni-directional image on the screen or one obtained by rendering, on the screen, a virtual space capable of representing 360 degrees, such as a 360-degree video, 360-degree image content, or 3D graphic modeling space.

According to an embodiment of the present disclosure, the 3D application may display an image for left eye and an image for right eye, respectively, corresponding to the left and right eye of the user based on a stereoscopic scheme.

The electronic device 102 may be a head-mounted display (HMD) device. The HMD device may be worn on the user's head and secured so as to be fastened to the user's head despite the user's movement. The electronic device 101 may be connected with the electronic device 102. Accordingly, the user may wear the electronic device 102 connected with the electronic device 101, observing the image for left eye and the image for right eye as displayed on the display of the electronic device 101.

According to an embodiment of the present disclosure, the electronic device 102 may include a housing 450 provided to be worn on the user's head, a dark change portion 430 provided in a region that corresponds to the position of the user's eyes, and at least one input button 421 provided in a region of the housing 450. The electronic device 102 may include a touch pad 425 through which an input (e.g., a swipe input) may be received from the user.

The user may bring his eyes into tight contact with the dark change portion 430, thereby enabling the user to observe an image by the 3D application provided from the electronic device 101 without interference by external light.

The electronic device 101 may be connected with the electronic device 102. The electronic device 101 may be wiredly and/or wirelessly connected with the electronic device 102. For example, the electronic device 101 may be connected with the electronic device 102 based on a universal serial bus (USB), but this is merely an example. It will be appreciated by one of ordinary skill in the art that any other connections that enable data communication between the electronic devices 101 and 102 may be used without limitation.

According to an embodiment of the present disclosure, the electronic device 101 and the electronic device 102 may be integrated in a single HMD VR device, as shown in FIG. 4A.

Figure 4B:
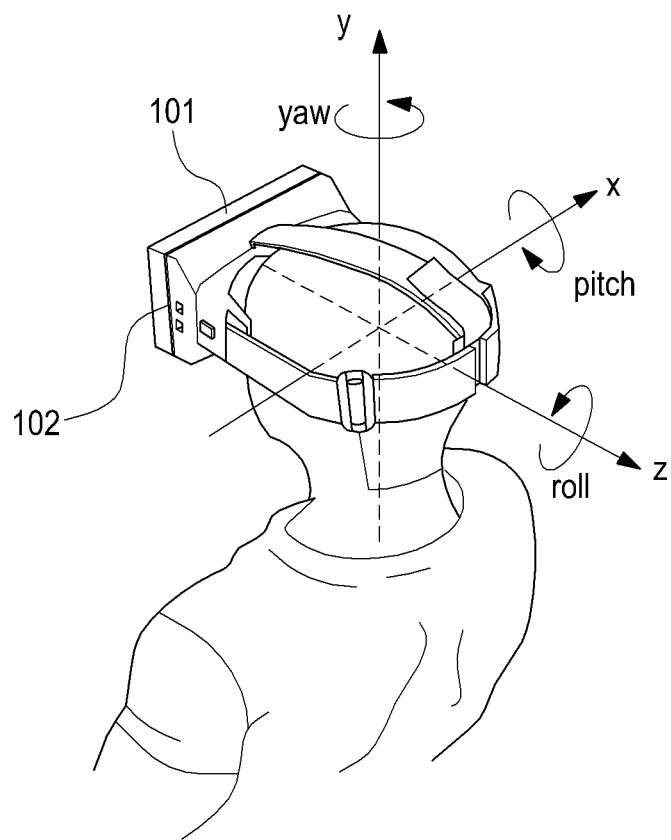
FIG. 4B is a perspective view illustrating an example of a user wearing an HMD device.

FIG. 4B is a perspective view illustrating an example of a user wearing an HMD device.

The user may put the housing of the electronic device 102 on his head. According to an embodiment of the present disclosure, the electronic device 101 may be combined with the electronic device 102. The user may view images displayed on the display of the electronic device 101. In case of a uni-body HMD device, an image for left eye and an image for right eye, respectively, may be displayed on the first and second windows of the HMD device in correspondence with the user's eyes. In this case, a VR service screen may be provided in the form of the virtual image overlapping a portion of the actual view image displayed on the first and second windows.

The electronic device 101 may display an image for left eye and an image for right eye on left and right portions, respectively, of the display. The image for left eye may be incident onto the user's left eye, and the image for right eye may be incident onto the user's right eye. For example, the image for left eye and the image for right eye both may be incident onto each of the user's eyes. The user may receive an AR service by observing the images incident onto his eyes.

The 3D application executed on the electronic device 101 may enable a display of an image for both eyes on the display. According to an embodiment of the present disclosure, the 3D application may vary and display the image for both eyes according to a motion (yaw, pitch, or roll) of the user or the electronic device 101 or 102.

Figure 4C:
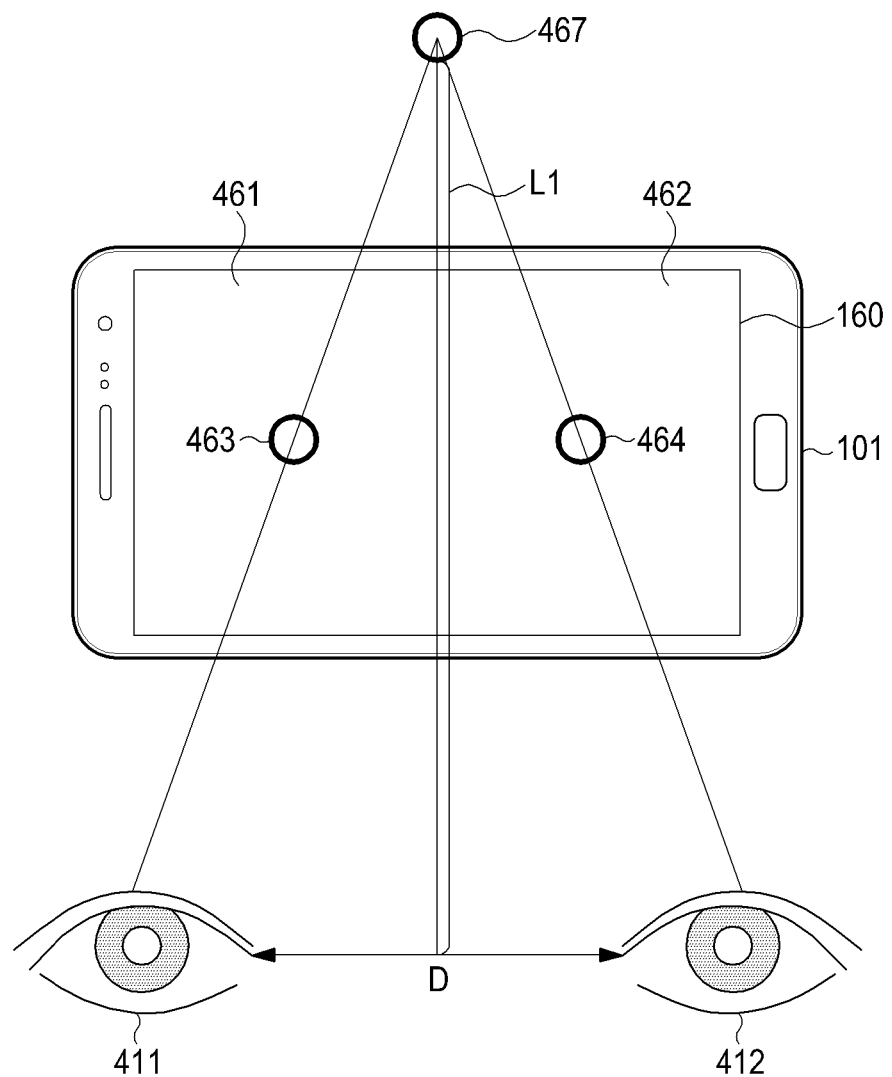
FIG. 4C is a view illustrating a display of an electronic device, according to an embodiment.

FIG. 4C is a view illustrating a display of an electronic device, according to an embodiment of the present disclosure.

The electronic device 101 may display an image 461 for left eye and an image 462 for right eye on the display 160. The image 461 for left eye may include a first object 463, and the eye image 462 for right eye may include a second object 464. According to an embodiment of the present disclosure, the first object 463 may correspond to the left eye 411, and the second object 464 may correspond to the right eye 412. The inter-pupillary distance (IPD), which is a distance between the left eye 411 and the right eye 412, may be equal to D. The image 461 for left eye and the image 462 for right eye, respectively, may correspond to the user's left and right eye and may be images that enable the user to view images while feeling a depth. According to an embodiment of the present disclosure, the image 461 for left eye and the image 462 for right eye may be images for an AR service and may be images configured to provide a stereoscopic feeling for at least part of an overall image for an AR service. For example, the image 461 for left eye and the image 462 for right eye may be produced to differ to provide a feeling of depth. The user may feel a sense of depth by observing a different respective image through each of his eyes.

The electronic device 101 may display a first object 463 and a second object 464 that are spaced apart from each other at a predetermined distance. The user may determine that an object image 467 is present at a point where a straight line passing through the left eye 411 and the first object 463 crosses a straight line passing through the right eye 412 and the second object 464. For example, the user may observe the presence of the object at a point that is positioned away from the user by a distance of L1.

Figure 5A:
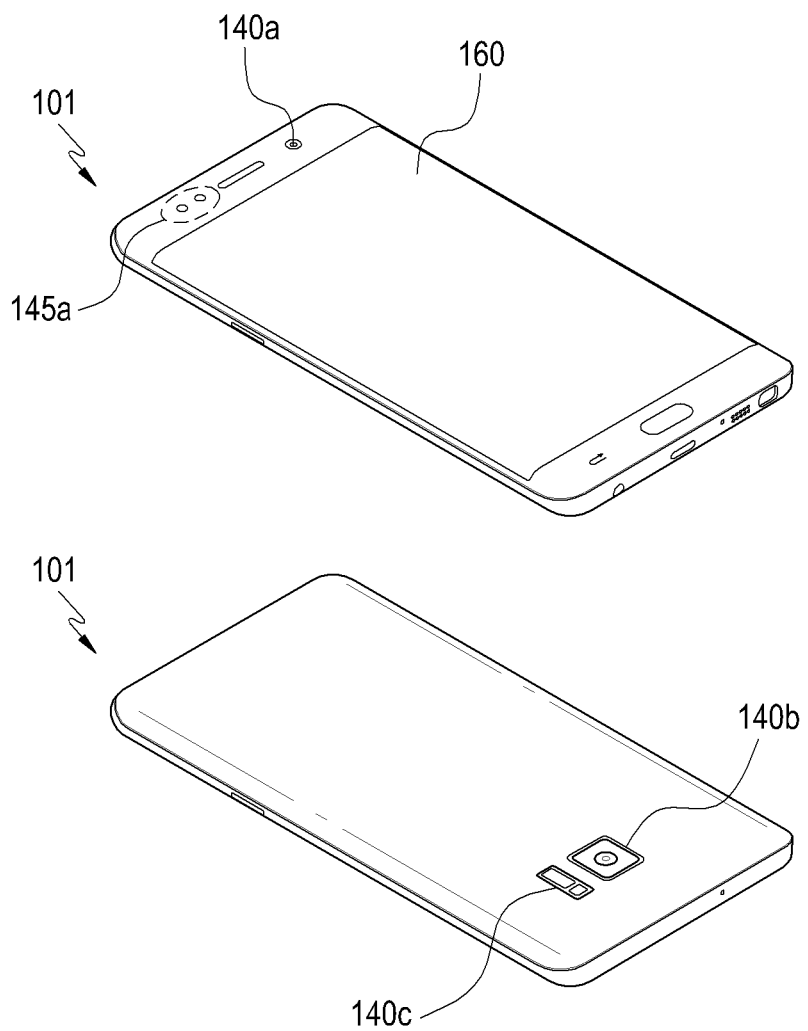
FIG. 5A is a perspective view illustrating an electronic device, according to an embodiment.

FIG. 5A is a perspective view illustrating an electronic device, according to an embodiment of the present disclosure.

Referring to FIG. 5A, a touchscreen-type display 160 may be positioned on the front surface of the electronic device 101. The display 160 may be large enough to take up a majority of the front surface of the electronic device 101. A first camera module 140a and a sensor module 145a may be positioned in a first end (e.g., a top end) of a first surface (e.g., the front surface) of the housing of the electronic device 101. The first camera module 140a may capture a face image that includes the user's eyes. The sensor module 145a may include a proximity sensor, an IR sensor, and an iris sensor. The sensor module 145a may obtain information about the eye's features (e.g., iris or pupil) from an image obtained by the sensor module 145a.

A second camera module 140b may be positioned on a second surface (e.g., the rear surface) of the housing of the electronic device 101 so as to be able to capture in a direction opposite to the direction that the first camera module 140a on the first surface faces. For example, as shown in FIG. 5A, the second camera module 140b and a flash 140c may be positioned in an upper end on the rear surface of the electronic device 101. As such, the first camera module 140a and the second camera module 140b may be positioned opposite each other, closer to the first end of the housing, i.e., at any one end positioned off the middle of the electronic device 101. For example, the first camera module 140a may be positioned anywhere an image of the eye area can be captured.

Figure 5B:
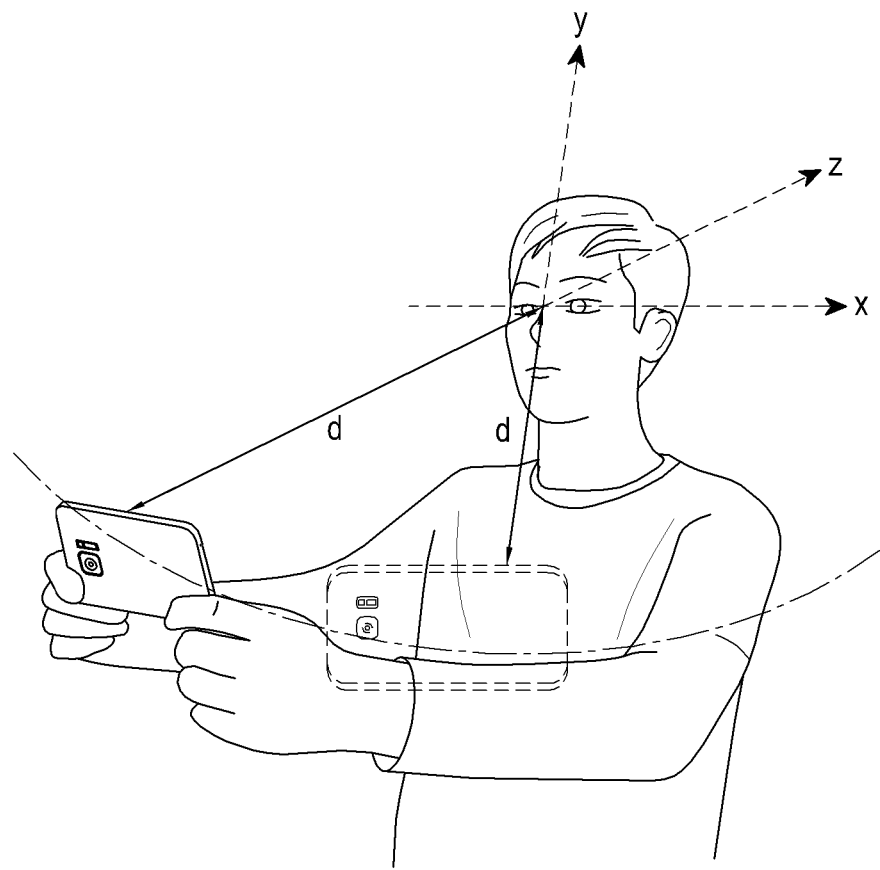
FIG. 5B is an example view a method for providing an AR service using an electronic device, according to an embodiment.

FIG. 5B is an example view a method for providing an AR service using an electronic device, according to an embodiment of the present disclosure.

For example, where the user makes use of an AR service while holding the electronic device 101 with his hands as shown in FIG. 5B, the user may generally capture in a rearward direction with respect to the electronic device 101, i.e., the user's front view, while maintaining a predetermined distance d from the electronic device 101 with respect to a reference axis (e.g., y axis). According to an embodiment of the present disclosure, where the user views the virtual image overlapping the front view while capturing the front view as shown in FIG. 5B, although the user moves the electronic device 101 to the user's side, the electronic device may be assumed to be left away from the user's face center or torso at a predetermined distance, e.g., about 20 cm, given, e.g., the user's arm length.

Where image capturing is performed with the electronic device 101 spaced apart from the user at a predetermined distance, it may be difficult to obtain a face image that includes the area of the user's eyes. Accordingly, for the user to facilitate to identify or monitor his eye area to control a display of the virtual image using the size of the eye area, a guide or the user's captured eye area image may be overlaid on the screen of the display (e.g., the display 160). At this time, an object image of the size and shape that corresponds to the eye area may virtually be displayed instead of displaying the user's eye image that is actually captured. Accordingly, the user may view the object image that varies based on the size of his eye area displayed overlaid on the AR service screen while viewing the AR service screen displayed using the display device, thereby enabling easier control of the virtual image.

Figure 6A:
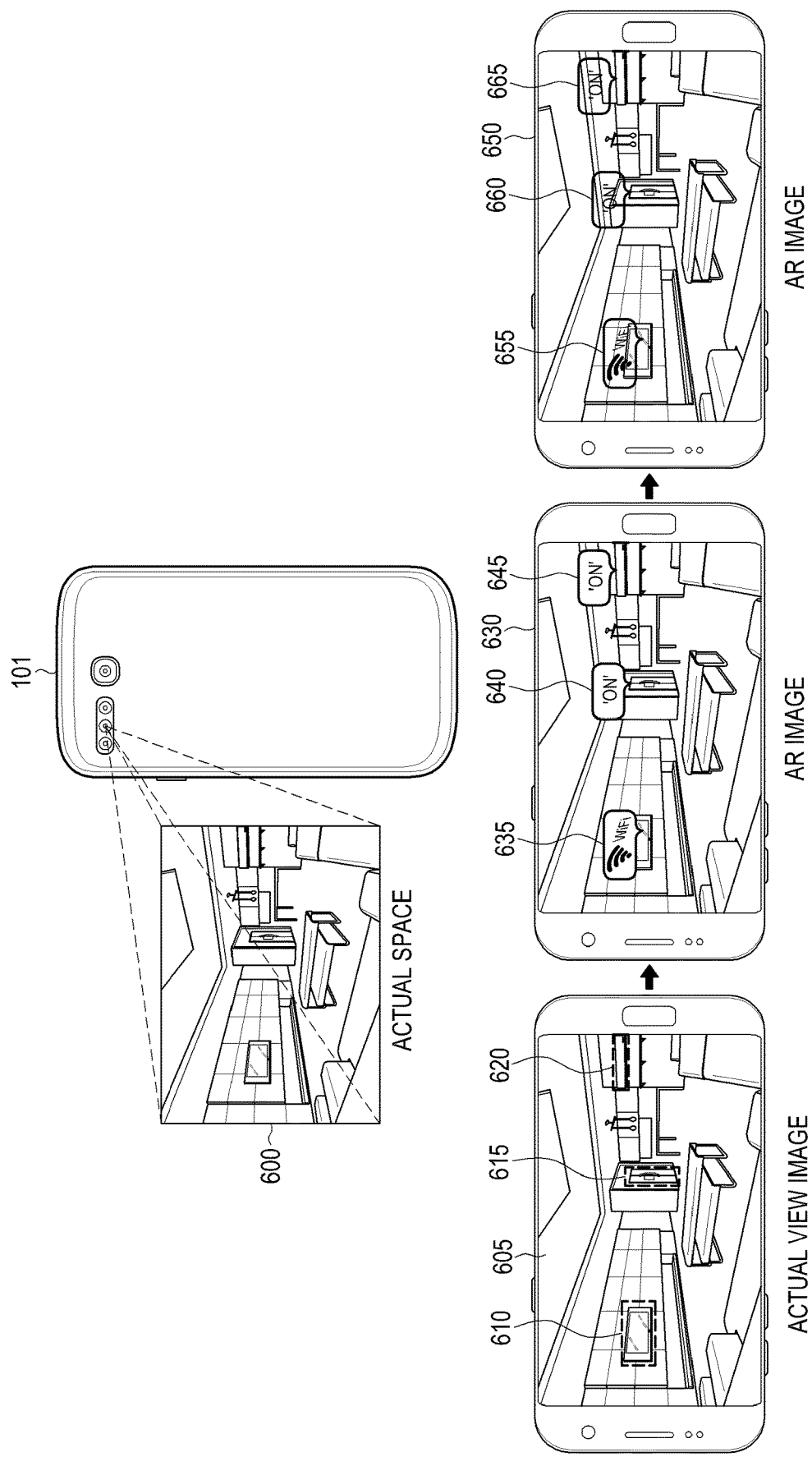
FIG. 6A is an example view illustrating an AR service, according to an embodiment.

FIG. 6A is an example view illustrating an AR service, according to an embodiment of the present disclosure.

Referring to FIG. 6A, where the user makes use of an AR service using the electronic device 101 in an indoor environment, the user may capture the actual space 600 in front through the camera module mounted on the rear surface of the electronic device 101. An actual view image 605 obtained by the camera module may be displayed on the display 160. At this time, use of the sensor module enables detection of the distance to each object positioned in the actual space.

Where there are a plurality of physical objects in the actual space 600 as shown in FIG. 6A, the electronic device 101 may recognize at least one object through an image recognition algorithm or sensing information of the sensor module in the actual view image 605. FIG. 6A illustrates an example of displaying a plurality of objects 610, 615, and 620 recognized through an image recognition processing process in the actual view image 605. At this time, the electronic device 101 may display the recognized objects together with indicators to enable the user to view the result of recognition, search for virtual images that correspond to the recognized objects, and associate a corresponding virtual image with each object. Accordingly, an AR image 630 obtained by matching the virtual images 635, 640, and 645 in the positions that correspond to the objects may be displayed.

FIG. 6A illustrates an example in which the recognized objects are a television (TV) 610, a refrigerator 615, and an air conditioner 620. FIG. 6A illustrates an example in which a first AR image 630, in which the virtual images 635, 640, and 645 including additional information about each of the TV 610, refrigerator 615, and air conditioner 620 match the objects in the actual space, are displayed on the display of the electronic device 101. At this time, each virtual image may be displayed to overlap based on the position of each physical object. Accordingly, where the virtual images are displayed overlapping in the positions of the physical objects, at least part of each physical object may be hidden. An example is shown in which, as compared with the virtual images in the first AR image 630, the virtual images in the second AR image 650 are displayed with the degree of display of the virtual images being varied.

At this time, the state of at least one of the user's eyes may be used to vary the degree of display of the virtual images. Where the user identifies each external object, the user may control the degree of display of the virtual images by taking different eyelid positions, e.g., closing either or both of the eyes. Accordingly, although the virtual images are displayed as overlapping the objects, the objects hidden may be viewed by overlaying the virtual images 655, 660, and 665 of which the degree of display, e.g., transparency, has been varied. In particular, all or some of the virtual images 655, 660, and 665 may be displayed to be transparent so that the objects underneath can be shown.

Figure 6B:
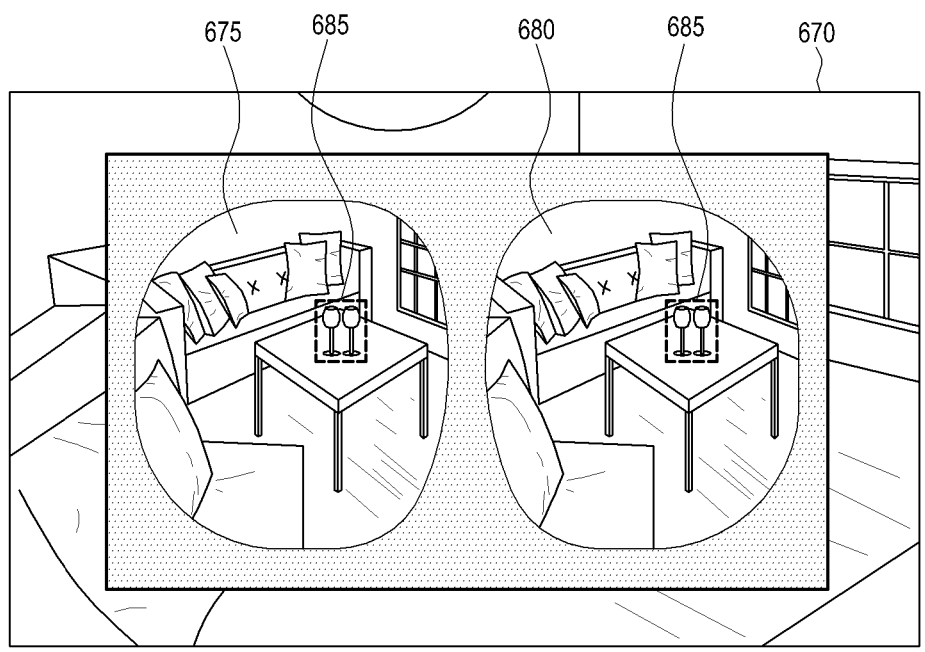
FIG. 6B is an example view illustrating a see-through mode in an electronic device, according to an embodiment.

FIG. 6B is an example view illustrating a see-through mode in an electronic device, according to an embodiment of the present disclosure.

FIG. 6B illustrates an example in which the user is gazing forward in an indoor environment while wearing an electronic device 101 (e.g., an HMD device). The electronic device 101 (e.g., the processor 120) may display a synthesized image of a virtual image 685 and an actual view image 670 captured by a camera module using a display device (e.g., the first and second windows). According to an embodiment of the present disclosure, in a see-through mode, the electronic device 101 (e.g., the processor 120) may display an image (e.g., a preview image) output from the camera module to each of two screen areas 675 and 680 which respectively correspond to the user's left and right eyes as shown in FIG. 6B.

According to an embodiment of the present disclosure, the electronic device 101 (e.g., the processor 120) may map the virtual image that corresponds to the object recognized in the actual view image and display the virtual image, and the electronic device 101 (e.g., the processor 120) may process the virtual image to be semi-transparent to be distinguished from the actual view image based on the user's eye state and then display the resulting virtual image. For example, where the electronic device is a projection display device as shown in FIG. 3A, the virtual images are not formed on the first and second windows, but rather represent images shown to the user. Where the electronic device is a uni-body head-mounted electronic device as shown in FIG. 4B, the virtual images may be images displayed on the first and second windows of the head-mounted electronic device. Where the electronic device is a head-mounted electronic device combined with a smartphone, the virtual images may be included on the image 461 for left eye and the image 462 for right eye.

Figure 7A:
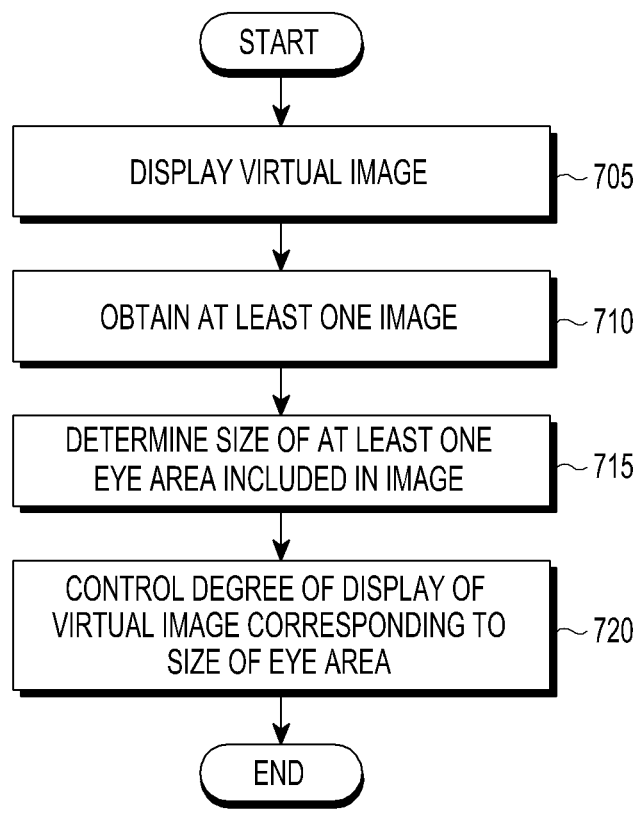
FIG. 7A is a flowchart illustrating an example of displaying a virtual image as per the size of an eye area in an electronic device, according to an embodiment.

FIG. 7A is a flowchart illustrating an example of displaying a virtual image as per the size of an eye area in an electronic device, according to an embodiment of the present disclosure.

Referring to FIG. 7A, upon executing an application for an AR service, the processor 120 may display a virtual image using a display device (e.g., the display device of FIG. 3A or display 160) in operation 705. While displaying the virtual image, the processor 120 may obtain at least one image using a first camera module of the electronic device 101 in operation 710. Where the first camera module faces the user's eyes, an image that includes at least one of the user's eyes may be obtained by the first camera module.

In operation 715, the processor 120 may determine the size of the at least one eye area included in the obtained image. In operation 720, the processor 120 may control the degree of display of the virtual image based on the size of the at least one eye area. For example, the processor 120 may vary the degree of display of the virtual image and display the resulting virtual image.

According to an embodiment of the present disclosure, the processor may be configured to vary a degree of display of at least one of a transparency, a highlight, an inversion, a color change, and a contour of the virtual image based on the size of the at least one eye area and to display the resulting virtual image. For example, the processor may adjust, e.g., the transparency or the highlight of the virtual image to be distinguished from the actual view (or its optical image) which the user is gazing based on the size of the at least one eye area and display the virtual image. To increase the visibility of the actual view image hidden by the virtual image, the processor may increase the transparency of the virtual image. For example, where the transparency of the virtual image is 90%, the visibility of the view image may be increased. Upon detecting the size of the eye area, which corresponds to the user's eye closing, for a predetermined time, the transparency of the virtual image may turn into 100%, thereby preventing the virtual image from being seen.

For example, the processor may invert the virtual image based on the size of the at least one eye area and stepwise adjust the color upon inversion. For example, the processor may change the color, or the background color, of the virtual image into a different color, based on the size of the at least one eye area. For example, the processor may vary, e.g., any of the thickness, type, or color of the contour of the virtual image based on the size of the at least one eye area.

According to an embodiment of the present disclosure, the processor 120 may be configured to vary a degree of display of at least one of a size or a ratio of the virtual image based on the size of the at least one eye area and to display the resulting virtual image. For example, the processor may stepwise enlarge or shrink the virtual image based on the size of the at least eye area and display the virtual image. At this time, where the virtual image is displayed using the projection display device of FIG. 3A, the virtual image of which the degree of display has been varied to be distinguished from the external object based on the size of the at least one eye area may be displayed. Here, the virtual image may be an image that is formed not on the display (e.g., the first and second windows) of the electronic device 101 corresponding to the user's eyes, but on the user's retina.

According to an embodiment of the present disclosure, although an example has been described above in which the degree of display of the virtual image is varied based on the size of the at least one eye area, the degree of display of the view image except the virtual image may be varied and the view image may be displayed. For example, the view image may be displayed to be opaque to be distinguished from the virtual image.

Figure 7B:
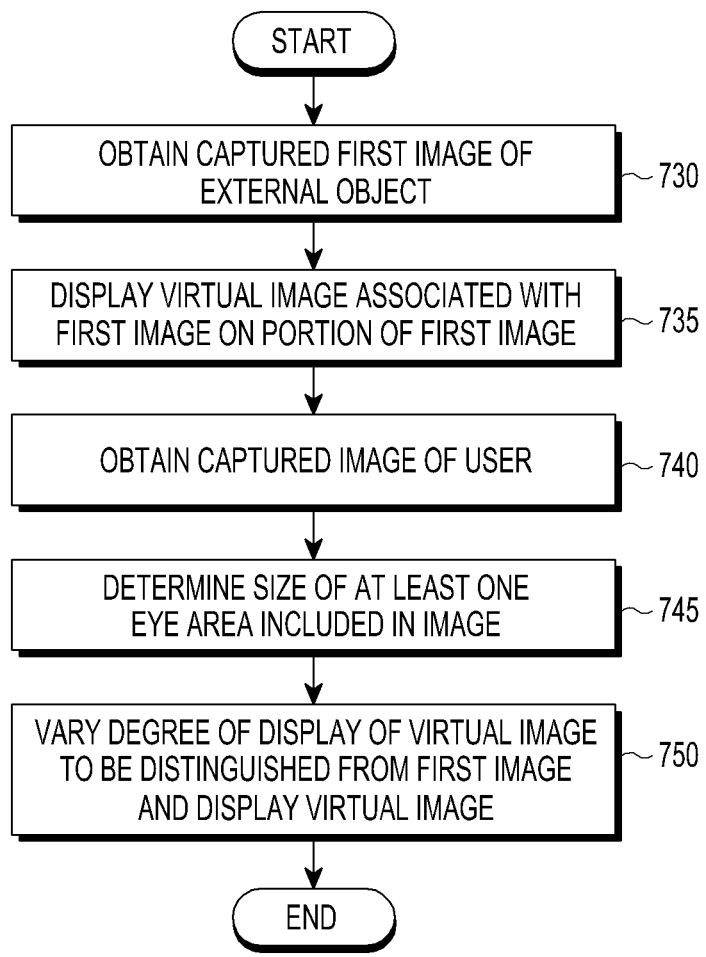
FIG. 7B is a flowchart illustrating an example of varying a virtual image displayed as an overlay on an actual view image as per the size of an eye area in an electronic device, according to an embodiment.

FIG. 7B is a flowchart illustrating an example of varying a virtual image displayed as on overlay on an actual view image as per the size of an eye area in an electronic device, according to an embodiment of the present disclosure.

Referring to FIG. 7B, the processor 120 may obtain a first image which is a captured image of an external object, using a camera module (e.g., the rear camera) in operation 730. In operation 735, the processor 120 may display a virtual image associated with the first image on a portion of the first image. In operation 740, the processor 120 may obtained a captured image of the user using a camera module (e.g., the front camera). In operation 745, the processor 120 may determine the size of at least one eye area included in the obtained image. In operation 750, the processor 120 may vary the degree of display of the virtual image to be distinguished from the first image and display the resulting virtual image.

According to an embodiment of the present disclosure, controlling the degree of display of the virtual image may include obtaining a first image by a second camera module positioned on a second surface which is positioned opposite a first surface of the electronic device, varying the display of display of the virtual image associated with the first image based on the size of the at least one eye area, and displaying the virtual image on a portion of the first image. For example, varying the degree of display of the virtual image associated with the first image and displaying the virtual image may include displaying the virtual image that stepwise differs in at least one of transparency and resolution based on the size of the at least one eye area to be distinguished from the first image.

According to an embodiment of the present disclosure, the processor may control the operation of determining whether a state of an eye closing is maintained for a predetermined amount of time using the size of the at least one eye area and the operation of releasing the display of the virtual image when the state of the eye closing is maintained for the predetermined amount of time.

Figure 8:
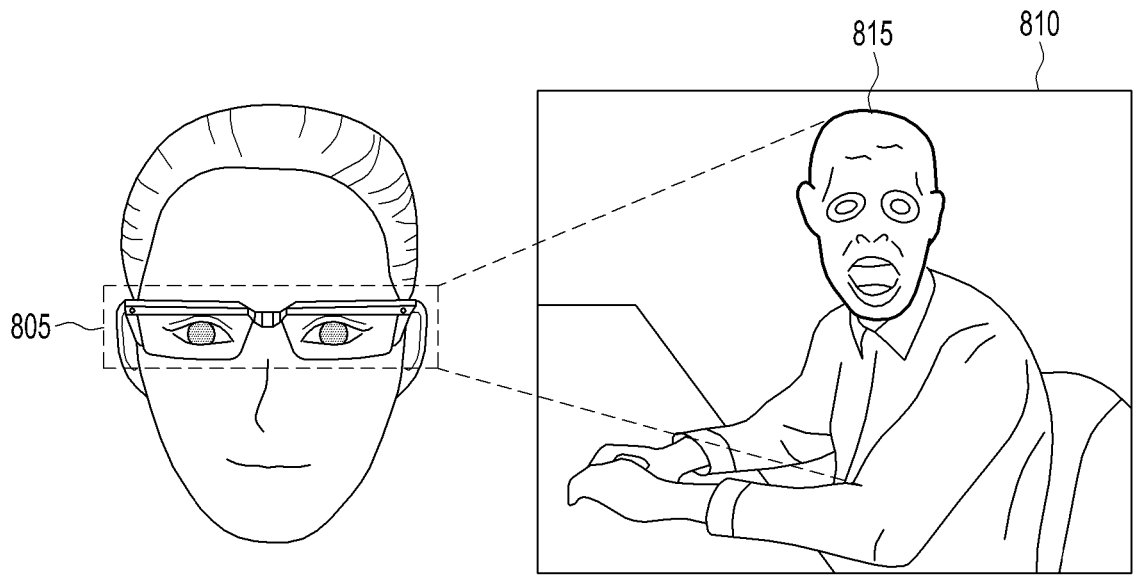
FIG. 8 is a view illustrating an example of a scheme of displaying a virtual image that varies in correspondence with the degree of eye closing, according to an embodiment.
Figure 8:
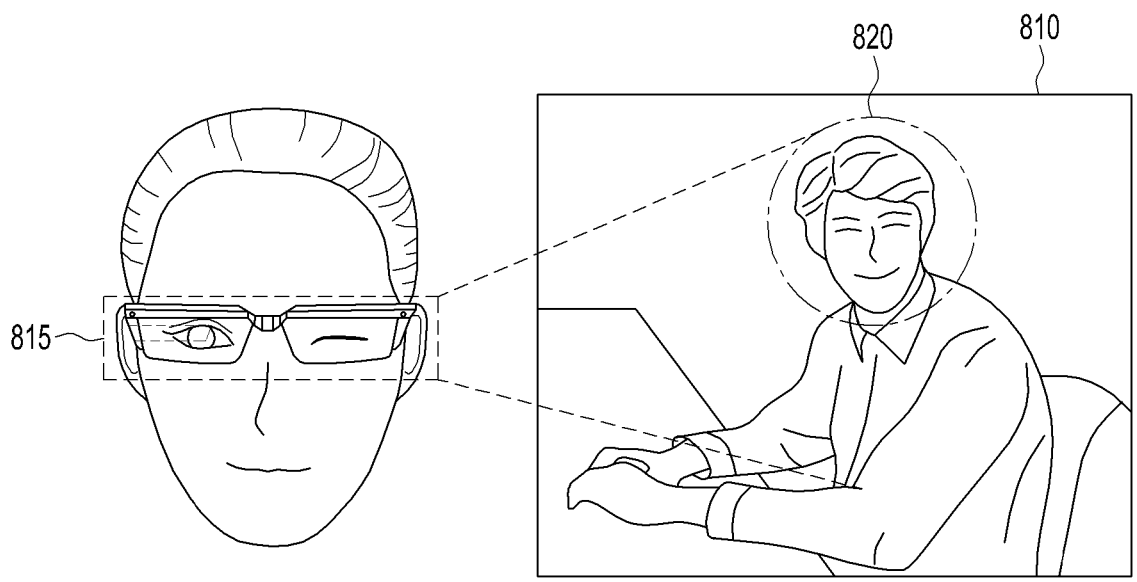

FIG. 8 is a view illustrating an example of a scheme of displaying a virtual image that varies based on the degree of eye closing, according to an embodiment of the present disclosure.

For example, where the user is gazing forward while wearing a projection display device as shown in FIG. 8, the user may view a front image 810 that includes an external object. When the user opens his eye as shown in the top portion of FIG. 8, a virtual image 815 may be displayed as overlapping a portion of an actual view image (an optical image of an actual view). For example, where a variation in the user's eye area 805 belongs to a mean eye area size range upon monitoring the size of the user's eye area, the virtual image 815-overlaid image 810 may be displayed.

While displaying the virtual image 815, the processor 120 may monitor variations in the size of at least one eye area of the user. When the state of departing from the mean eye area size range lasts for a predetermined amount of time as a result of the monitoring, the degree of display of the virtual image may be varied. For example, when the user closes either or both eyes as shown in the bottom portion of FIG. 8, the scheme of displaying the virtual image may be varied to distinguish the virtual image from the actual view image based on the eye state 817, and the virtual image may be displayed. Where the state of closing the eye lasts for a predetermined amount of time, the display of the virtual image may be released (as illustrated in item 820), thereby enabling the object hidden by the virtual image to be shown.

Figure 9A:
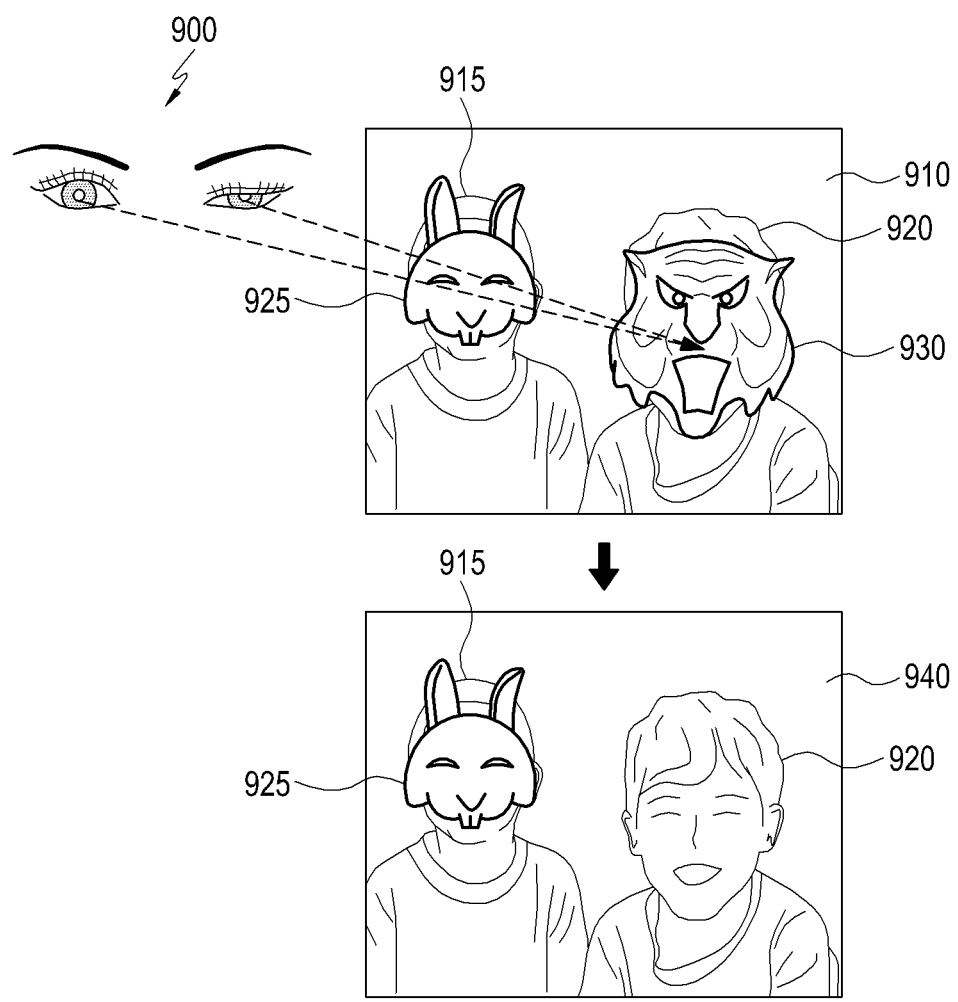
FIGS. 9A and 9B are views illustrating examples of schemes of displaying a virtual image that varies in correspondence with changes in eye states, according to an embodiment.
Figure 9B:
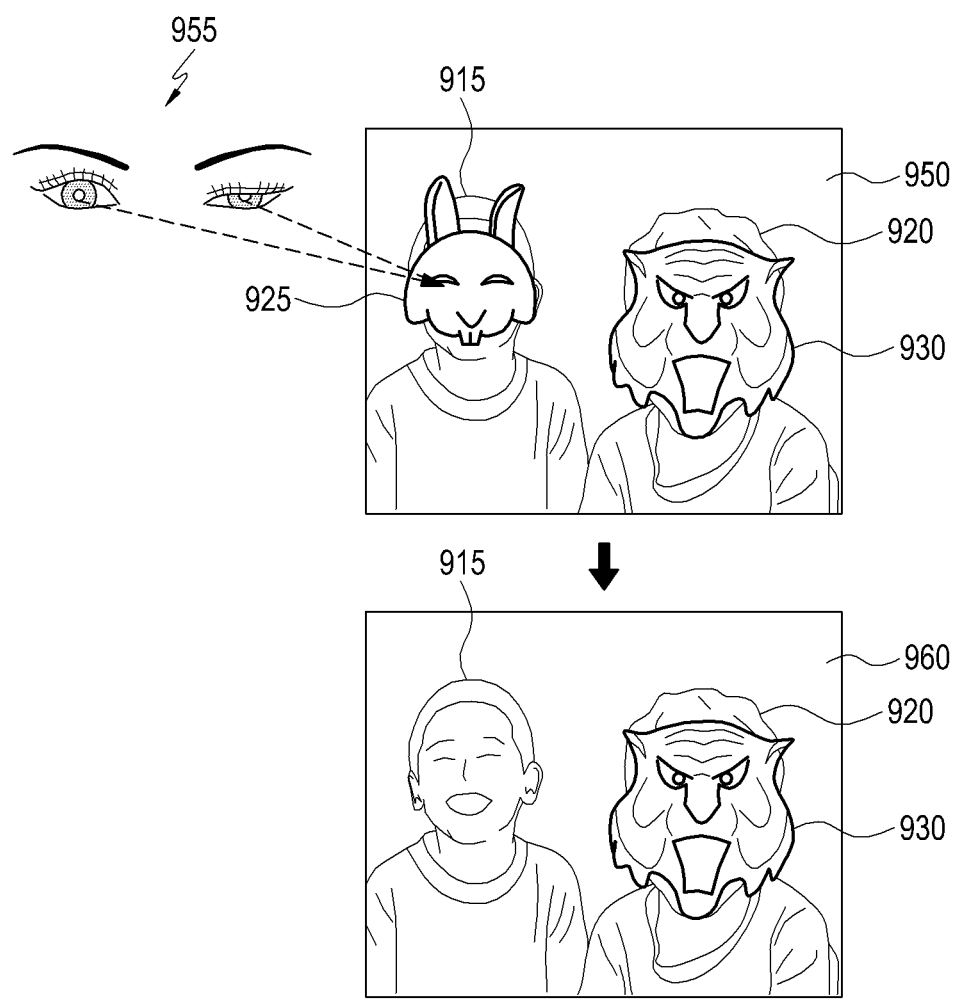

FIGS. 9A and 9B are views illustrating examples of schemes of displaying a virtual image that varies corresponding to changes in eye states according to an embodiment of the present disclosure.

FIG. 9A illustrates an example in which virtual images 925 and 930 are overlaid on a first AR image 910 including a plurality of objects 915 and 920 to hide the objects 915 and 920. Although an example is described, for ease of description, in which the objects 915 and 920 are fully hidden by the virtual images 925 and 930, they may be replaced with virtual objects including, e.g., any of shapes, icons, and/or contents associated with the objects. According to an embodiment of the present disclosure, the virtual objects may be provided as if they are real-life objects. For example, virtual objects represented as, e.g., a rabbit and a tiger, may be provided next to the objects 915 and 920 to provide such an effect as if they are indeed in the presence of the user.

Where the two objects 915 and 920 are hidden by the virtual images 925 and 930, the user may selectively release, or vary the degree of display of, one of the virtual images 925 and 930. To that end, the processor 120 may detect the eye state 900 based on the size of at least one eye area of the user. At this time, the processor 120 may detect the gaze as well as the size of the eye area from the obtained image. Accordingly, the processor 120 may detect the one of the two objects 915 and 920 which the user is gazing at and may vary the display of the virtual image that corresponds to the determined object.

For example, upon detecting a variation in the size of the eye area while the user's gaze corresponds to one object 920, the processor 120 may remove, or vary the degree of display of, the virtual image based on the detected size of the eye area. FIG. 9A illustrates an example in which a virtual image 930 has been removed in a second AR image 940. According to an embodiment of the present disclosure, the virtual image 930 may be varied in transparency so as to enable the hidden object 920 to be shown instead of being removed.

Referring to FIG. 9B, upon detecting (as illustrated with reference to item 955) a variation in the size of the eye area while the user's gaze faces the virtual image 925 in a third AR image 950, the virtual image 925 that corresponds to the user's gaze may be removed as in a fourth AR image 960. As such, it is possible to choose the user's desired virtual image and vary the degree of display of the chosen virtual image while displaying an image that includes a plurality of virtual images which respectively correspond to a plurality of objects.

Figure 10:
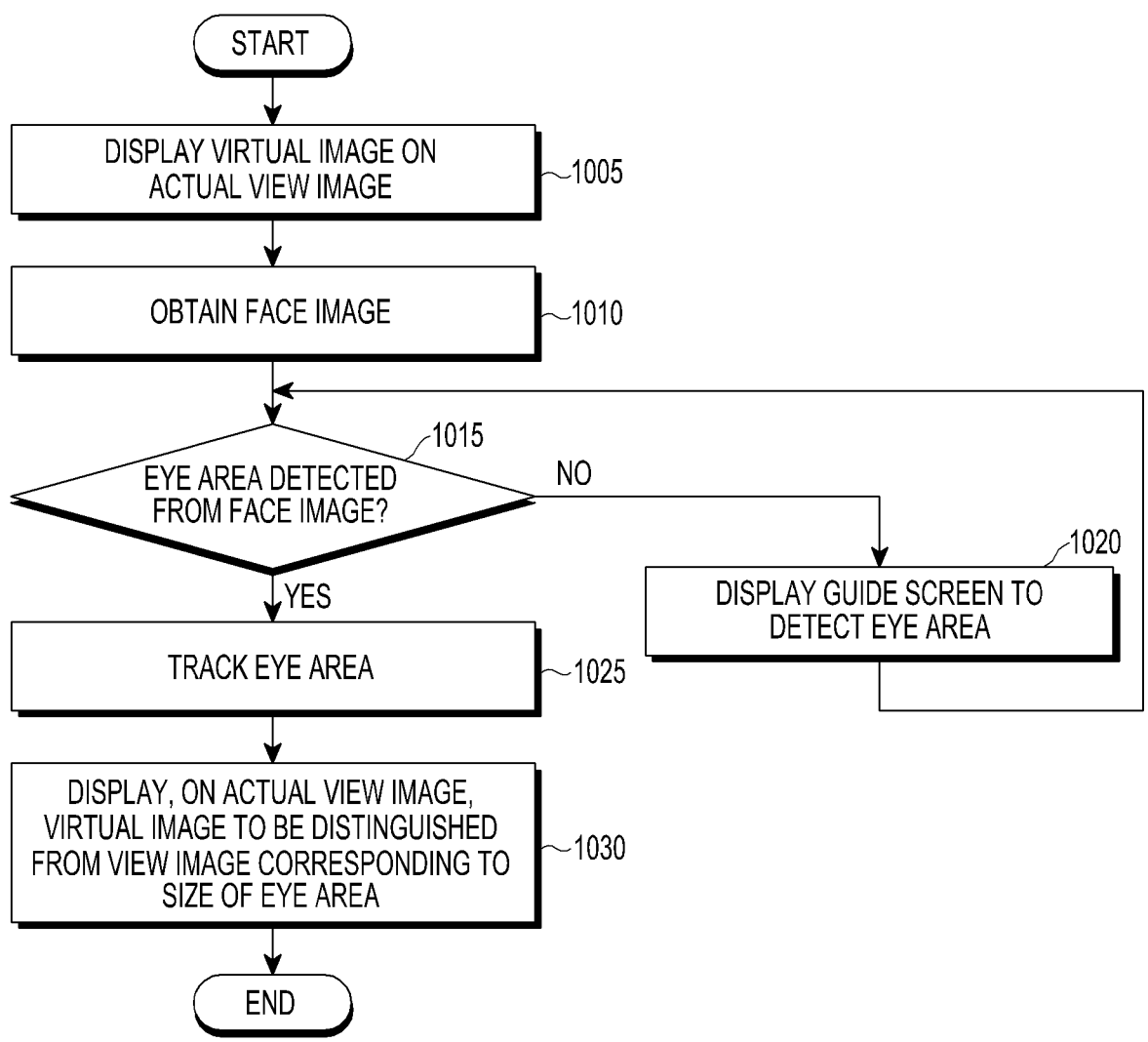
FIG. 10 is a flowchart illustrating an example of displaying a virtual image as per detection of an eye area in an electronic device, according to an embodiment.

FIG. 10 is a flowchart illustrating an example of displaying a virtual image as per detection of an eye area in an electronic device, according to an embodiment of the present disclosure.

Referring to FIG. 10, the processor 120 may display a virtual image on an actual view image in operation 1005. For example, where the user makes use of an AR service while holding the electronic device 101 with his hands as shown in FIG. 5B, the user may capture an image in a forward direction of the electronic device 101, i.e., the user's face, while maintaining a predetermined distance d from the electronic device 101.

The processor 120 may obtain a captured face image of the user's face in operation 1010. The processor 120 may determine whether an eye area is detected within the obtained face image in operation 1015. Where image capturing is performed with the electronic device 101 spaced apart from the user at a predetermined distance, it may be impossible to obtain a face image that includes the area of the user's eyes. To obtain an image that includes the eye area, a guide screen for detecting the eye area may be displayed in operation 1020. For example, such a screen may be displayed as to enable the user to easily identify or monitor his eye area to control the display of virtual images using the size of his eye area. While displaying the guide screen, the processor 120 may return to operation 1015 to continue to detect the eye area from the obtained image. Upon detecting at least one eye area in operation 1015, the processor 120 may track the eye area in operation 1025. Based on the result of tracking the eye area, the processor 120 may display a virtual image on the actual view image to be distinguished from the view image, based on the size of the eye area in operation 1030, as shown in FIGS. 11A, 11B, 11C, and 11D. In this aspect, the processor 120 may vary the degree of display of the virtual image and display the resulting virtual image.

Figure 11A:
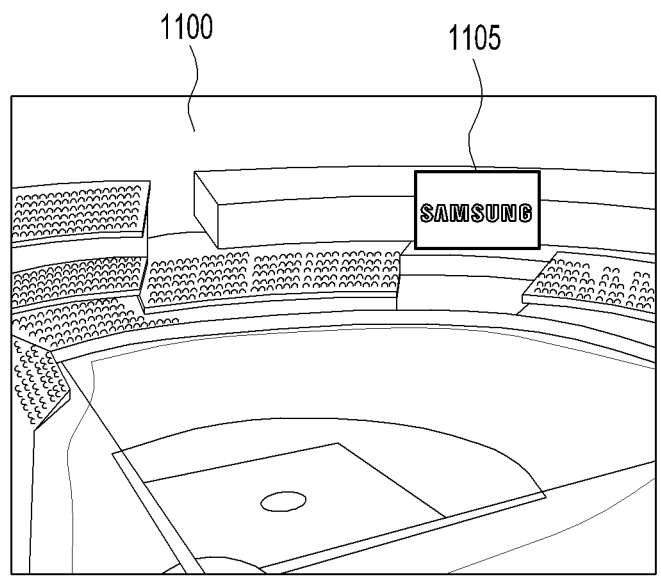
FIGS. 11A, 11B, 11C, and 11D are views illustrating examples of varying the scheme of displaying a virtual image overlaid on an actual view image in an electronic device, according to an embodiment.
Figure 11B:
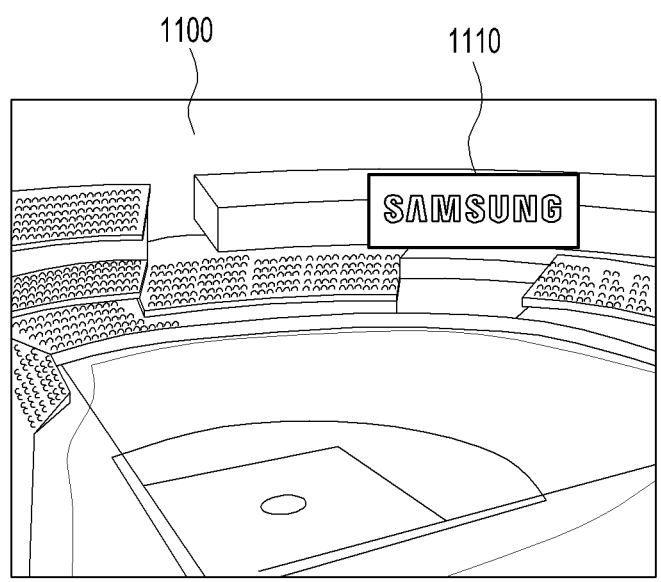
Figure 11C:
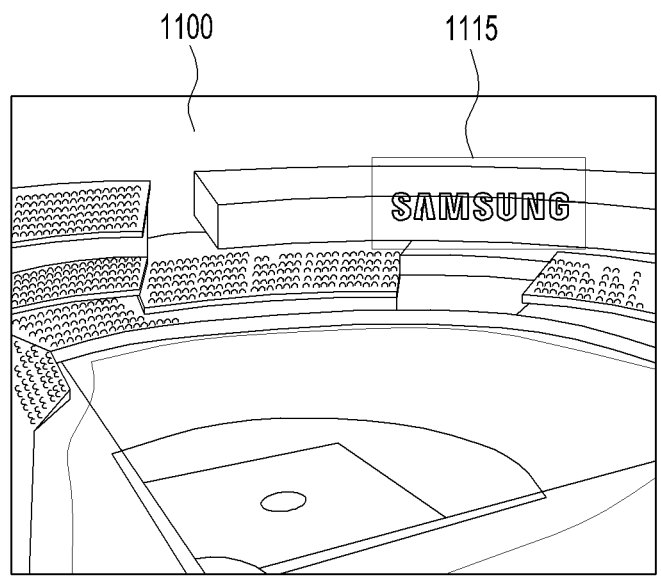
Figure 11D:
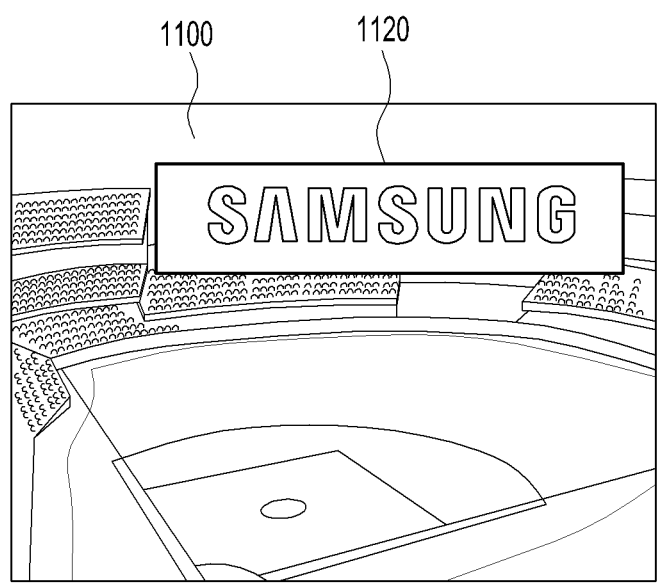

FIGS. 11A, 11B, 11C, and 11D are views illustrating examples of varying the scheme of displaying a virtual image that is overlaid on an actual view image in an electronic device, according to an embodiment of the present disclosure. FIG. 11A illustrates an example in which a scoreboard and a space of a baseball stadium are displayed in a front view when the user executes an AR service in the baseball stadium. As shown in FIG. 11A, a virtual image 1105 that overlaps the scoreboard may be displayed in correspondence with an external object, e.g., the scoreboard, in the actual view image 1100. In particular, the virtual image 1105 may be an advertisement image. At this time, the actual scoreboard may be hidden by the virtual image 1105. Where the user changes his eye state, the processor 120 may control the output of the virtual image of which the degree of display of at least one of, e.g., a color, a size, and a highlight of the virtual image, has been varied as shown in FIGS. 11B, 11C, and 11D, based on variations in the size of the eye area. FIG. 11B illustrates an example in which the size of the virtual image 1110 is varied as compared with the virtual image 1105. FIG. 11C illustrates an example in which the transparency of the virtual image 1115 is varied. FIG. 11D illustrates an example in which the size and magnification of the virtual image 1120 are varied.

FIGS. 12, 13, 14, 15, 16, and 17 are views illustrating examples of varying the scheme of displaying a virtual image overlaid on an actual view image in an electronic device, according to an embodiment of the present disclosure.

Figure 12:
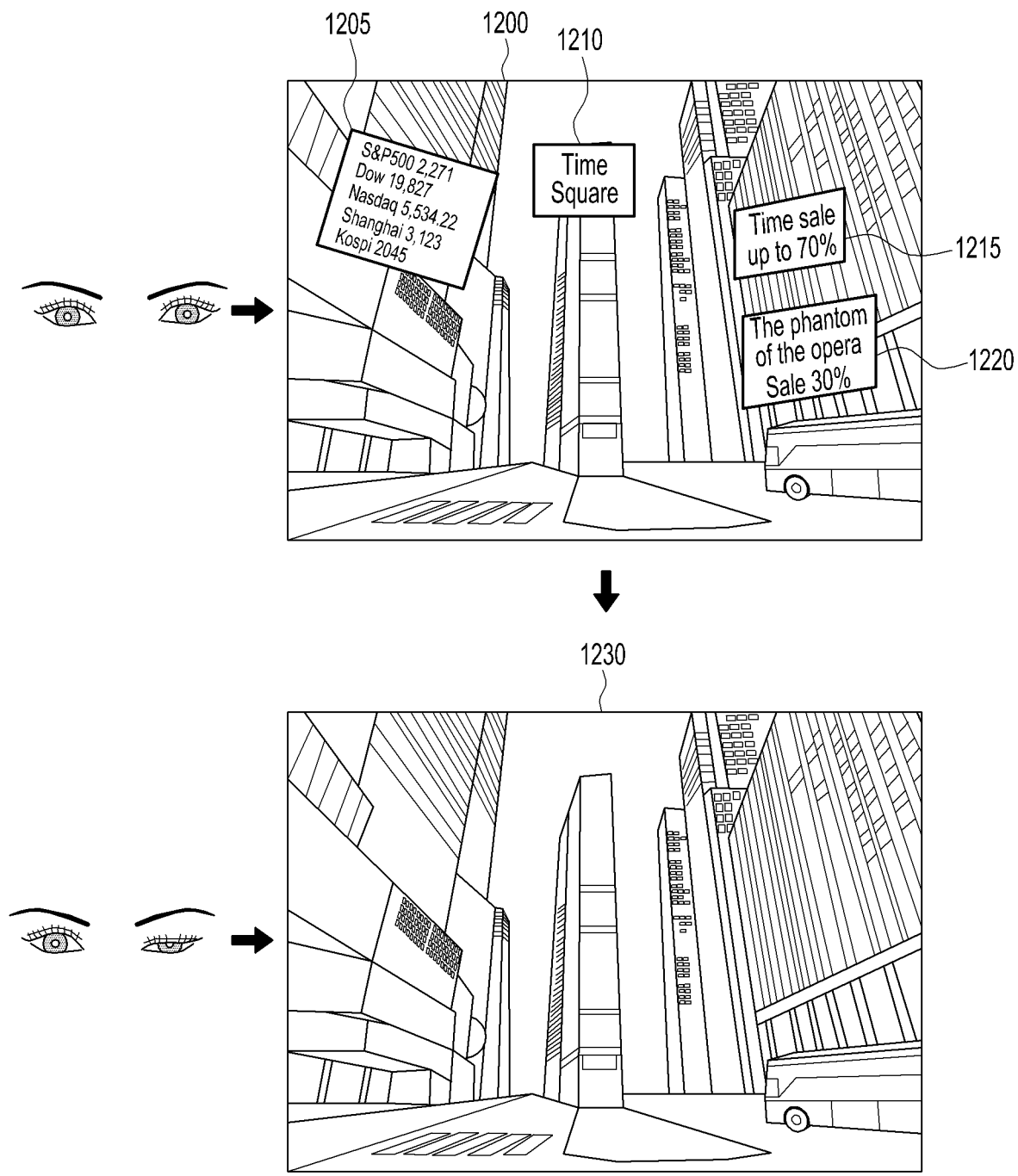
FIG. 12 is a view illustrating an example of providing distance information on a street view image, according to an embodiment.

FIG. 12 illustrates an example of providing distance information on a street view image, according to an embodiment of the present disclosure.

Where the user moves while wearing or holding in his hand the electronic device 101, a street view image 1200 where ambient buildings are located may be seen as shown in FIG. 12. Upon playing back or displaying the street view image captured using a 360-degree omni-directional camera as shown in FIG. 12, the respective corresponding virtual images 1205, 1210, 1215, and 1220 of the objects (e.g., the buildings) included in the street view image 1200 may be overlaid and displayed. Where the virtual images 1205, 1210, 1215, and 1220 are similar in shape or appear as actual buildings, the user may have difficulty in recognizing his desired building or driving direction due to, e.g., the ambient buildings being hidden by the virtual images 1205, 1210, 1215, and 1220.

Where the user desires to identify the virtual image and signage or see the hidden buildings, the user may view the street view image 1230 of which the degree of display has been varied, e.g., the virtual images 1205, 1210, 1215, and 1220 have been removed therefrom, by varying his eye state, e.g., at least partially closing either or both his eyes or closing only one eye. Although FIG. 12 illustrates, as an example, the street view image 1230 where the virtual images 1205, 1210, 1215, and 1220 have been removed, methods for varying the degree of display of the virtual images 1205, 1210, 1215, and 1220 so that the overall street can be shown may not be limited thereto. For example, the overall street view may be shown by adjusting the respective transparency of each of the virtual images 1205, 1210, 1215, and 1220 or rendering the virtual images 1205, 1210, 1215, and 1220 to be transparent so that only the contours are shown in dotted lines. Accordingly, the user may easily identify only the virtual images within the street view image.

Figure 13:
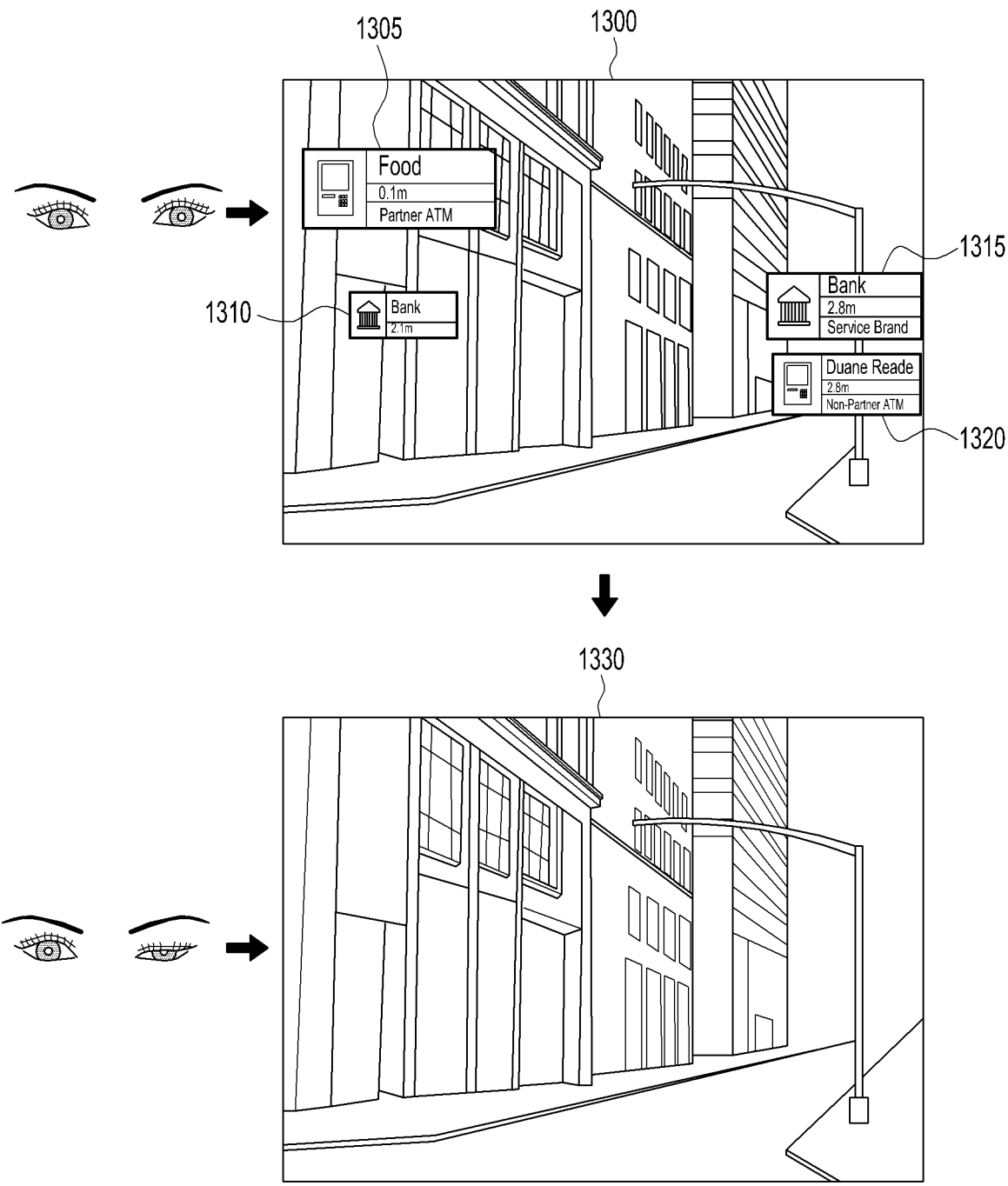
FIG. 13 is a view illustrating an example of providing tour information on a street view image, according to an embodiment.

FIG. 13 illustrates an example of providing tour information on a street view image, according to an embodiment of the present disclosure.

FIG. 13 illustrates an AR image 1300 that provides the distance from the user and tour information for moving a corresponding attraction site by using virtual images 1305, 1310, 1315, and 1320. For example, various pieces of information, such as restaurant information, bank information, or bus information, may be provided by using the virtual images 1305, 1310, 1315, and 1320.

In this case, the AR image 1300 may correspond to an actual street view image. As the type and amount of tour information increases, simultaneously providing the virtual images 1305, 1310, 1315, and 1320 may deteriorate the readability or usefulness of the information. Accordingly, the user may remove the virtual images by varying his eye state if he desires. When the user who has gently closed his eye opens the eye, a displaying of the virtual images that had previously been removed may be resumed. At this time, automatically providing and partially providing the user's desired one of the plurality of virtual images may rely on various eye states, such as closing either or both eyes, at least partially, or closing only one eye. Further, a virtual image may selectively be provided by, e.g., the user's gaze.

Figure 14:
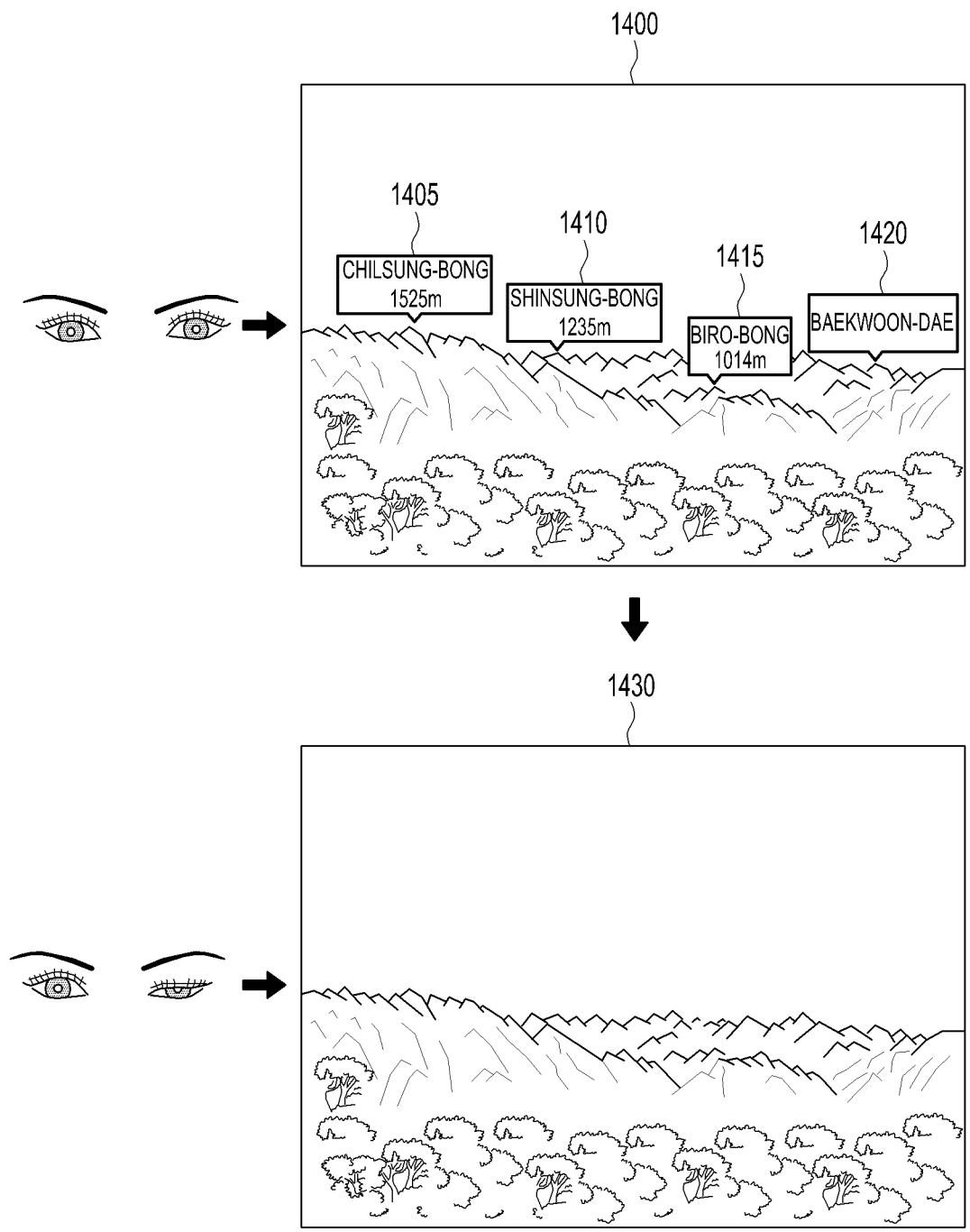
FIG. 14 is a view illustrating an example of providing topography information on a topography image, according to an embodiment.

FIG. 14 illustrates an example of providing topography information on a topography image, according to an embodiment of the present disclosure.

As shown in FIG. 14, brief topography information about the surrounding topography of the user, e.g., when the user travels or mountain-climbs, may be provided by using virtual images 1405, 1410, 1415, and 1420. For the brief topography information, AR information may be provided by using simplified forms of virtual objects, such as text or icons. Upon desiring to remove AR information or see the overall view while receiving information that is necessary through the AR information, the user may easily remove the virtual images from display by varying the eye state, such as fully or partially closing at least one eye.

Figure 15:
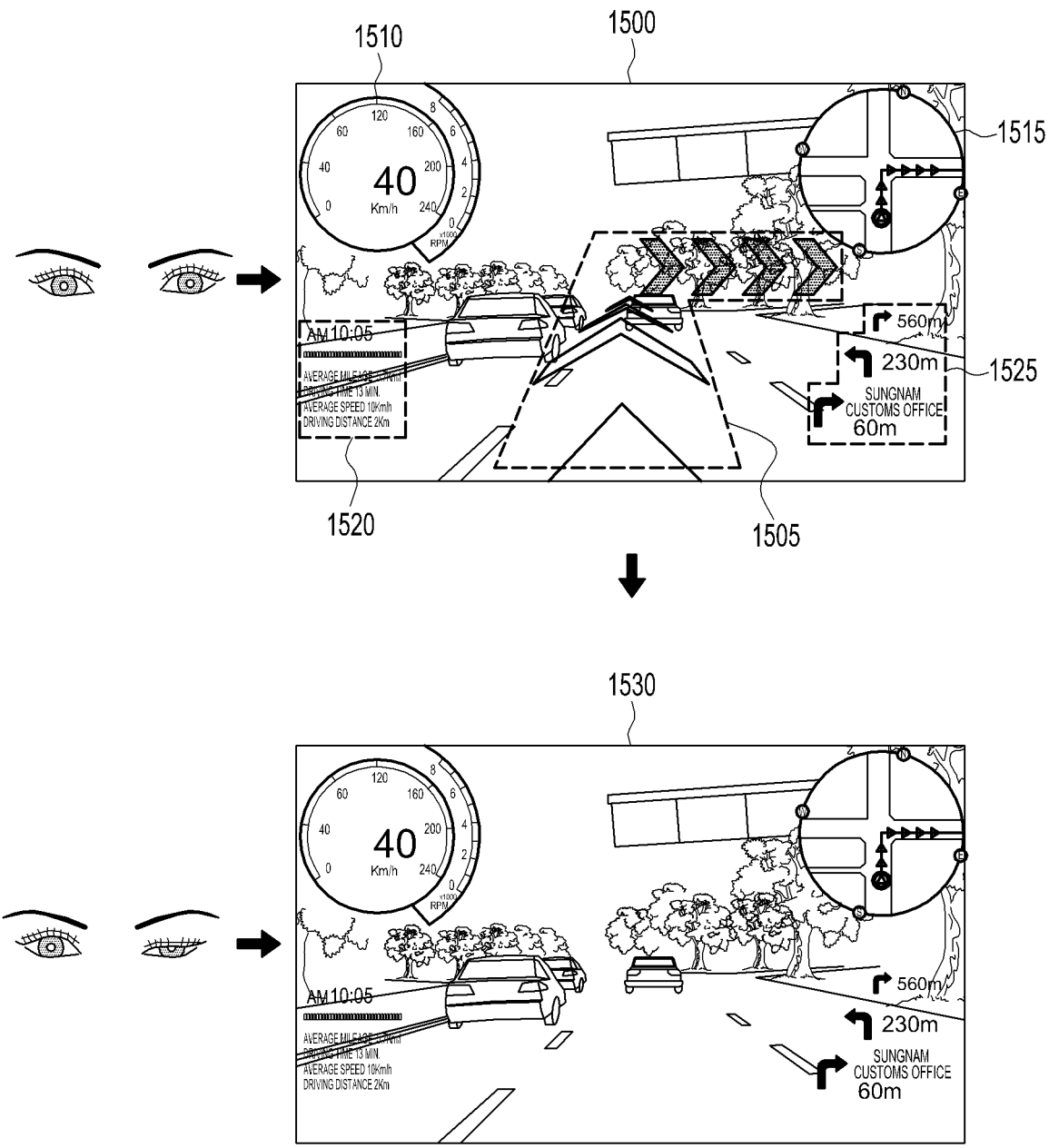
FIG. 15 is a view illustrating an example of providing drive information upon a navigation service, according to an embodiment.

FIG. 15 illustrates an example of providing drive information upon a navigation service, according to an embodiment of the present disclosure.

As shown in FIG. 15, when the user wearing the electronic device 101 drives a car, an arrow 1505 for navigation is displayed as though floating over a road image 1500, and virtual images 1510, 1515, 1520, and 1525 are also displayed, such as shapes, icons, or text, so as to correspond to the relevant driving information. Where the actual road or car ahead is hidden by a virtual image, such as the navigation arrow 1505, the user may easily remove all or some, e.g., the arrow 1505 on road, of the virtual images 1505, 1510, 1515, 1520, and 1525, from the display of the road image 1530 by varying his eye state, e.g., fully or partially closing at least one eye to identify the actual road image.

Figure 16:
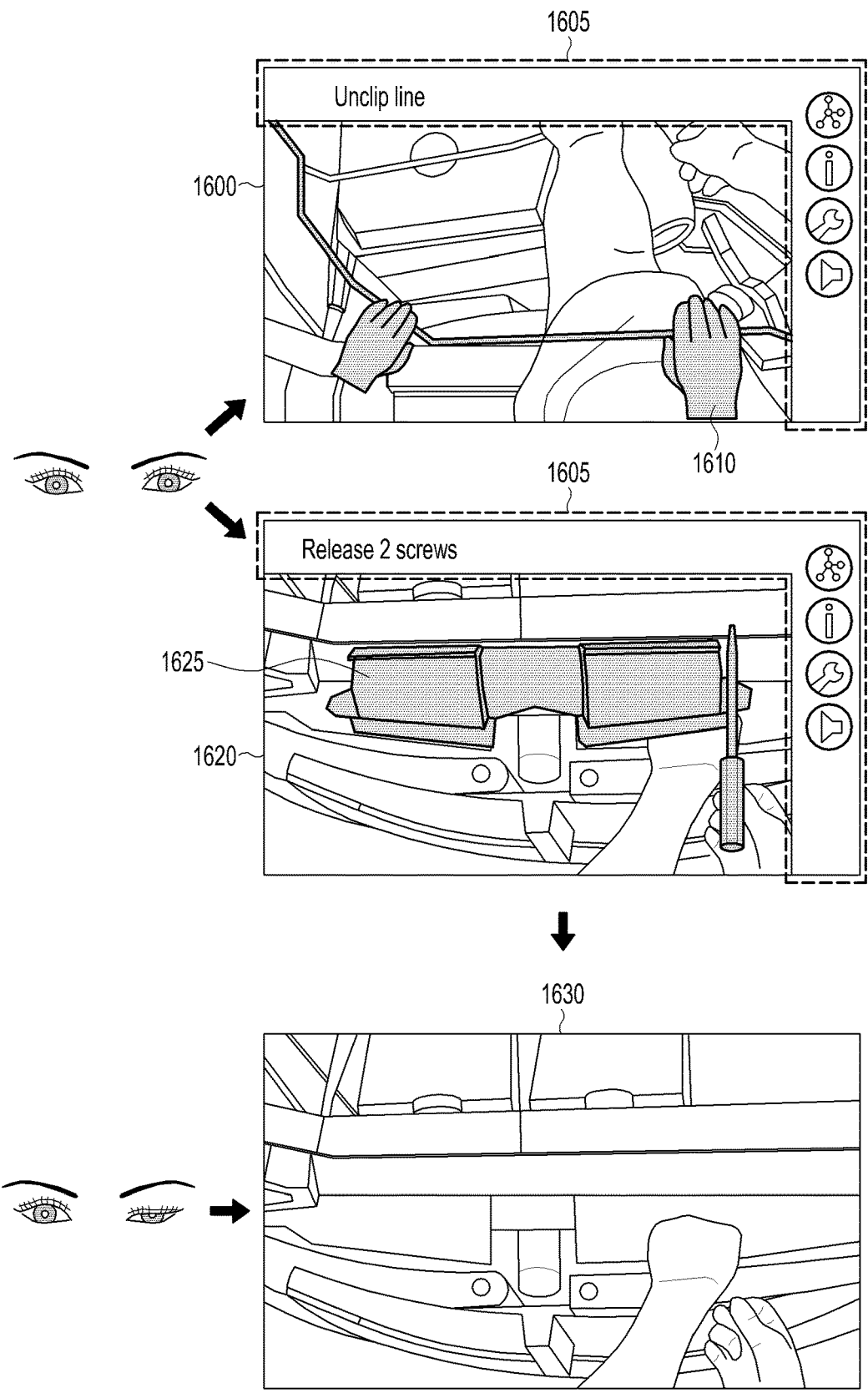
FIG. 16 is a view illustrating an example of providing car repair information upon a car repair service, according to an embodiment.

FIG. 16 illustrates an example of providing car repair information upon a car repair service, according to an embodiment of the present disclosure.

As shown in FIG. 16, the user wearing the electronic device 101 may be guided for car maintenance by using an AR service. As the user gets his car maintained, virtual images 1605, 1610, and 1625 for car maintenance guide, which correspond to the inside-car images 1600 and 1620 per maintenance step, may be displayed as overlays. For example, when the user attempts to check the part hidden by the virtual image 1625 for car maintenance guide, the user may see the actual inside-car image 1630 where the virtual image has been removed by varying his eye state, e.g., partially closing at least one eye or closing only one eye. According to an embodiment of the present disclosure, embodiments of the present disclosure may be applied to various AR services where virtual images are displayed. For example, the user may easily activate or deactivate the display of virtual images simply by closing his eye, and such method may be applied to various AR guide or training services, such as cooking, surgery, furniture manufacture, or workout, but not only to car maintenance.

Figure 17:
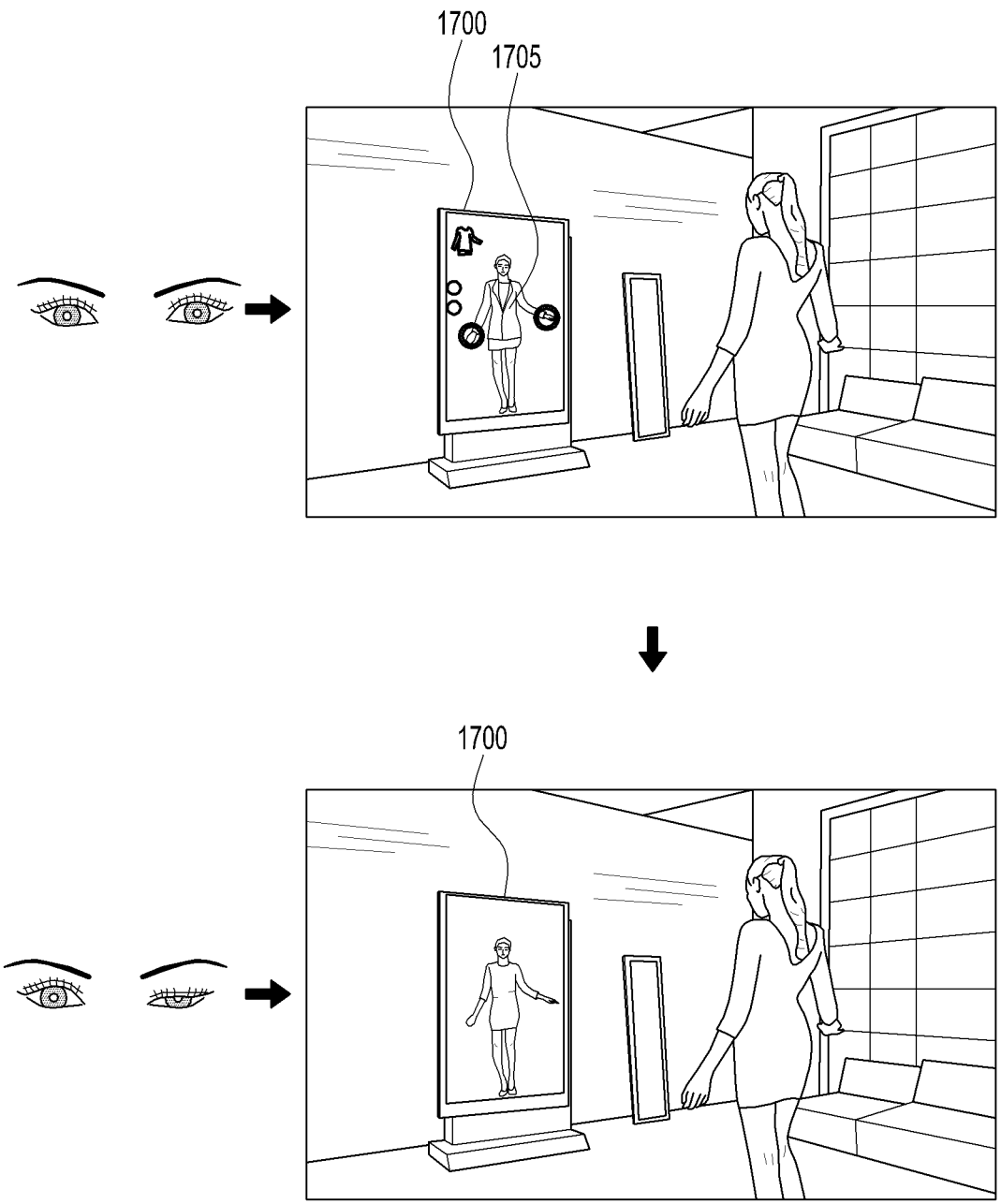
FIG. 17 is a view illustrating an example of providing style information upon a smart mirror service, according to an embodiment.

FIG. 17 illustrates an example of providing style information upon a smart mirror service, according to an embodiment of the present disclosure. As shown in FIG. 17, where the user checks what style of clothes fits him using a smart mirror 1700, a virtual clothes image 1705 may be displayed as an overlay on the actual user appearance on the smart mirror 1700. According to an embodiment of the present disclosure, the smart mirror 1700 may include a camera to capture the user's eye state. Upon detecting a variation in the size of at least one eye area of the user which is captured by the camera, the actual user appearance with the virtual clothes image 1705 removed may be displayed on the smart mirror 1700.

As used herein, the term "module" includes a unit configured in hardware, software, and/or firmware and may interchangeably be used with other terms, e.g., "logic," "logic block," "part," or "circuit." The module may be a single integral part or a minimum unit or part of performing one or more functions. The module may be implemented mechanically or electronically and may include, e.g., any of an application-specific integrated circuit (ASIC) chip, field-programmable gate arrays (FPGAs), or programmable logic device, that has been known or to be developed in the future as performing some operations.

According to an embodiment of the present disclosure, at least a part of the device (e.g., modules or their functions) or method (e.g., operations) may be implemented as instructions stored in a transitory or non-transitory computer-readable storage medium (e.g., the memory 130), e.g., in the form of a program module. The instructions, when executed by a processor (e.g., the processor 120), may enable the processor to carry out a corresponding function. The computer-readable medium may include, e.g., any one or more of a hard disk, a floppy disc, a magnetic medium (e.g., magnetic tape), an optical recording medium (e.g., CD-ROM, DVD, magnetic-optical medium (e.g., floptical disk), or an embedded memory. The instruction may include a code created by a compiler or a code executable by an interpreter.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, in parallel, repeatedly or heuristically, or at least some operations may be executed in a different order or omitted or other operations may be added.

According to an embodiment of the present disclosure, there may be provided a transitory or non-transitory storage medium storing instructions, the instructions configured to be executed by at least one processor to enable the at least one processor to perform at least one operation comprising obtaining an image using a first camera module while displaying a virtual image, determining a size of at least one eye area included in the obtained image, and controlling a degree of display of the virtual image based on the size of the at least one eye area.

As is apparent from the foregoing description, according to embodiments of the present disclosure, there may be provided a method for differently displaying virtual images that overlap a real-life image based on the degree of the user's eye closing.

Embodiments of the present disclosure enable the user to distinguish virtual images from others while wearing a wearable device, e.g., an HMD device, in order to receive an AR service, thereby increasing user convenience.

Various embodiments of the present disclosure may provide virtual images that instantly distinguishable by the user by the degree of eye closing in the user's desired circumstance.

Embodiments of the present disclosure enable a user to intuitively and easily use features for a purpose of distinguishing virtual images from others by the degree of eye closure, thereby enhancing user experience.

The embodiments disclosed herein are proposed for description and understanding of the disclosed technology and do not limit the scope of the present disclosure. Accordingly, the scope of the present disclosure should be interpreted as including all changes or various embodiments based on the technical spirit of the present disclosure.

What is claimed is:

1. An electronic device, comprising:
a first camera module;
a display device; and
a processor that is functionally connected with each of the first camera module and the display device, wherein the processor is configured to:
control the first camera module to capture a first image including at least one eye area of a user,
obtain an actual view image;
recognize an external object within the actual view image,
identify a first virtual image associated with the external object,
display the first virtual image on a portion of the actual view image using the display device, the first virtual image corresponding to the portion of the actual view image and hiding a portion of the external object of the actual view image,
identify a degree of eye closing of the at least one eye area included in the first image captured by the first camera module while displaying the first virtual image overlaid on the external object of the actual view image,
change the display of the first virtual image by adjusting at least one characteristic of the first virtual image to distinguish the first virtual image from the external object of the actual view image based on the identified degree of eye closing of the at least one eye area, and
remove the display of the first virtual image when a state of an eye closing based on the degree of eye closing is maintained for a predetermined time,
wherein, when a plurality of virtual images are displayed, only a transparency in a virtual image of the plurality of virtual images which corresponds to a user's gaze is adjusted based on the degree of eye closing, and a display of a virtual image of the plurality of virtual images which does not correspond to the user's gaze is maintained.

2. The electronic device of claim 1, wherein the processor is further configured to vary a degree of display of at least one from among a transparency, a highlight, an inversion, a color change, and a contour of the first virtual image based on the identified degree of eye closing of the at least one eye area and to display the first virtual image that has the varied degree of display.

3. The electronic device of claim 1, wherein the processor is further configured to vary a degree of display of at least one from among a size and a ratio of the first virtual image based on the identified degree of eye closing of the at least one eye area and to display the first virtual image that has the varied degree of display.

4. The electronic device of claim 1, wherein when the display device is a projection display device, the processor is further configured to display the first virtual image of which a degree of display has been varied to be distinguished from the external object by using the projection display device.

5. The electronic device of claim 1, wherein the first camera module is positioned on a first surface of the electronic device, wherein the electronic device further comprises a second camera module positioned on a second surface of the electronic device which is positioned opposite the first surface, and wherein the processor is further configured to control the second camera module to obtain a second image and to display the first virtual image on a portion of the second image by using the display device, wherein the first virtual image is a virtual image associated with the second image.

6. The electronic device of claim 5, wherein the processor is further configured to control to output the first virtual image that differs in at least one from among a transparency and a resolution to be distinguished from the second image, based on the identified degree of eye closing of the at least one eye area.

7. The electronic device of claim 5, wherein the second image includes an image for a left eye and an image for a right eye.

8. The electronic device of claim 5, wherein the processor is further configured to obtain a third image captured for at least one external object by the second camera module, to recognize the at least one external object included in the third image, to associate each of the at least one external object with at least one virtual image based on a result of the recognition, and to control to display the at least one virtual image associated with each of the at least one external object.

9. The electronic device of claim 8, wherein the at least one virtual image is an advertisement image that corresponds to the at least one external object.

10. The electronic device of claim 1, wherein the processor is further configured to identify whether the state of the eye closing is maintained for the predetermined time by using the identified degree of eye closing of the at least one eye area after releasing the display of the first virtual image and to display the first virtual image by using the display device when the state of the eye closing is maintained for the predetermined time.

11. The electronic device of claim 1, wherein the processor is further configured to identify whether the degree of eye closing of the at least one eye area is less than or equal to a mean eye area size and to vary a degree of display of the first virtual image based on the identified degree of eye closing of the at least one eye area when a state in which a size of the at least one eye area is identified as being less than or equal to the mean eye area size is maintained for the predetermined time and to display the first virtual image that has the varied degree of display.

12. The electronic device of claim 11, wherein the processor is further configured to stepwise increase at least one from among a transparency and a highlight of the first virtual image based on the identified degree of eye closing of the at least one eye area and to display the first virtual image that has the increased at least one from among the transparency and the highlight.

13. A method for displaying a first virtual image in an electronic device, the method comprising:
obtaining an actual view image;
recognizing an external object within the actual view image;
identifying a first virtual image associated with the external object;
displaying the first virtual image on a portion of the actual view image, the first virtual image corresponding to the portion of the actual view image and hiding a portion of the external object of the actual view image;
capturing a first image including at least one eye area of a user by using a first camera module of the electronic device while displaying the first virtual image overlaid on the external object of the actual view image;
identifying a degree of eye closing of the at least one eye area included in the captured first image;
changing the display of the first virtual image by adjusting at least one characteristic of the first virtual image to distinguish the first virtual image from the external object of the actual view image based on the identified degree of eye closing of the at least one eye area; and removing the display of the first virtual image when a state of an eye closing based on the degree of eye closing is maintained for a predetermined time, wherein, when a plurality of virtual images are displayed, only a transparency in a virtual image of the plurality of virtual images which corresponds to a user's gaze is adjusted based on the degree of eye closing, and a display of a virtual image of the plurality of virtual images which does not correspond to the user's gaze is maintained.

14. The method of claim 13, wherein the changing the display of the first virtual image includes varying a degree of display of at least one from among a transparency, a highlight, an inversion, a color change, and a contour of the first virtual image based on to the identified degree of eye closing of the at least one eye area and displaying the first virtual image that has the varied degree of display.

15. The method of claim 13, wherein the changing the display of the first virtual image includes varying a degree of display of at least one from among a size and a ratio of the first virtual image based on the identified degree of eye closing of the at least one eye area and displaying the first virtual image that has the varied degree of display.

16. The method of claim 13, wherein when the electronic device includes a projection display device, the changing the display of the first virtual image includes displaying the first virtual image of which a degree of display has been varied to be distinguished from the external object by using the projection display device.

17. The method of claim 13, further comprising obtaining a second image by a second camera module positioned on a second surface which is positioned opposite a first surface of the electronic device upon which the first camera module is positioned and displaying the first virtual image on a portion of the second image, wherein the first virtual image is a virtual image associated with the second image.

18. The method of claim 17, wherein the first virtual image is displayed to stepwise differ in at least one from among a transparency and a resolution based on the identified degree of eye closing of the at least one eye area to be distinguished from the second image.

19. The method of claim 13, wherein the changing the display of the first virtual image and the displaying the first virtual image include identifying whether the degree of eye closing of the at least one eye area is less than or equal to a mean eye area size; and when a state in which a size of the at least one eye area is identified as being less than or equal to the mean eye area size is maintained for the predetermined time, varying a degree of display of the first virtual image based on the identified degree of eye closing of the at least one eye area and displaying the first virtual image that has the varied degree of display.

20. A non-transitory storage medium storing instructions, the instructions configured to be executed by at least one processor of an electronic device to enable the at least one processor to perform at least one operation, the at least one operation comprising:

obtaining an actual view image;

recognizing an external object within the actual view image;

identifying a first virtual image associated the external object;

displaying the first virtual image on a portion of the actual view image, the first virtual image corresponding to the portion of the actual view image and hiding a portion of the external object of the actual view image;

capturing an image including at least one eye area of a user by using a first camera module of the electronic device while displaying the first virtual image overlaid on the external object of the actual view image;

identifying a degree of eye closing of the at least one eye area of an eye included in the captured image;

changing the display of the first virtual image by adjusting at least one characteristic of the first virtual image to distinguish the first virtual image from the external object of the actual view image based on the identified degree of eye closing of the at least one eye area; and removing the display of the first virtual image when a state of an eye closing based on the degree of eye closing is maintained for a predetermined time, wherein, when a plurality of virtual images are displayed, only a transparency in a virtual image of the plurality of virtual images which corresponds to a user's gaze is adjusted based on the degree of eye closing, and a display of a virtual image of the plurality of virtual images which does not correspond to the user's gaze is maintained.

21. An electronic device, comprising:

a first camera module configured to obtain a first image including at least one eye area of a user;

a second camera module configured to obtain a second image;

a display device; and a processor configured to:

control the first camera module to obtain the first image for the at least one eye area of the user, control the second camera module to obtain the second image, recognize an external object within the second image, identify a first virtual image associated the external object, display the first virtual image on a portion of the second image, the first virtual image corresponding to the portion of the second image being displayed to hide a portion of the external object of the second image, identify at least one parameter that relates to the at least one eye area included in the first image, and change the display of the first virtual image by adjusting at least one characteristic of the first virtual image to distinguish the first virtual image from the external object of the second image based on the identified at least one parameter, wherein the at least one parameter comprises a state of eye closure, and wherein the display device is further configured to remove the display of the first virtual image and display the second image when the state of the eye closure is maintained for a predetermined time, wherein, when a plurality of virtual images are displayed, only a transparency in a virtual image of the plurality of virtual images which corresponds to a user's gaze is adjusted based on the degree of eye closing, and a display of a virtual image of the plurality of virtual images which does not correspond to the user's gaze is maintained.

22. The electronic device of claim 21, wherein the at least one parameter includes at least one from among a height of a pupil, a diameter of the pupil, a height of an iris, a diameter of the iris, a first state in which an eye included in the at least one eye area is fully open, a second state in which the eye included in the at least one eye area is partially closed, and a third state in which the eye included in the at least one eye area is fully closed.

23. The electronic device of claim 21, wherein the at least one characteristic of the first virtual image includes at least one from among a transparency, a highlight, an inversion, a color, and a contour.

24. The electronic device of claim 21, wherein the processor is further configured to identify whether the state of the eye closure is maintained for at least a predetermined amount of time based on the identified at least one parameter and to further adjust the at least one characteristic of the first virtual image based on whether the state of the eye closure is maintained for the predetermined amount of time,
 wherein the state of the eye closure includes at least one from among a first state in which an eye is fully open, a second state in which the eye is partially closed, and a third state in which the eye is fully closed.

25. The electronic device of claim 24, wherein the processor is further configured to identify when the state of the eye closure changes, and to further adjust the at least one characteristic of the first virtual image based on a change in the state of the eye closure.

* * * * *